(12) United States Patent
Ellul et al.

(10) Patent No.: US 8,653,197 B2
(45) Date of Patent: *Feb. 18, 2014

(54) THERMOPLASTIC VULCANIZATE COMPOSITION

(75) Inventors: Maria D. Ellul, Silver Lake Village, OH (US); Periagaram S. Ravishankar, Kingwood, TX (US); Jianya Cheng, Kingwood, TX (US); Paul E. McDaniel, Cuyohoga Falls, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/446,693

(22) Filed: Apr. 13, 2012

(65) Prior Publication Data

US 2013/0102721 A1  Apr. 25, 2013

Related U.S. Application Data

(63) Continuation of application No. 11/497,091, filed on Aug. 1, 2006, now Pat. No. 8,178,625.

(51) Int. Cl.
*C08L 23/16* (2006.01)
*C08L 23/12* (2006.01)

(52) U.S. Cl.
USPC ........ 525/236; 525/232; 525/240; 525/331.7; 525/332.1; 525/332.5; 525/332.8

(58) Field of Classification Search
USPC .......................... 525/236, 232, 240
See application file for complete search history.

(56) References Cited

U.S. PATENT DOCUMENTS

| | | | | |
|---|---|---|---|---|
| 5,571,868 A | * | 11/1996 | Datta et al. | 525/211 |
| 5,677,382 A | * | 10/1997 | Tsuji et al. | 525/237 |
| 5,691,413 A | * | 11/1997 | Morikawa et al. | 525/99 |
| 6,268,438 B1 | | 7/2001 | Ellul et al. | |
| 6,686,419 B2 | * | 2/2004 | Wouters et al. | 525/237 |
| 7,915,354 B2 | * | 3/2011 | Wouters et al. | 526/65 |
| 8,178,625 B2 | * | 5/2012 | Ellul et al. | 525/236 |
| 2006/0052541 A1 | | 3/2006 | Hagen et al. | |

FOREIGN PATENT DOCUMENTS

| | | |
|---|---|---|
| WO | WO 98/20069 | 5/1998 |
| WO | WO 00/26296 | 5/2000 |
| WO | WO 03/066725 | 8/2003 |

* cited by examiner

*Primary Examiner* — Rip A. Lee

(57) ABSTRACT

The disclosure is directed to a thermoplastic vulcanizate composition comprising a dynamically-cured rubber; from about 20 to about 300 parts by weight of a thermoplastic resin per 100 parts by weight rubber and from about 30 to about 250 parts by weight additional oil per 100 parts by weight rubber; wherein the rubber comprises a multimodal polymer composition cured with a curing agent, the multimodal polymer composition comprising 45 to 75 wt % of a first polymer fraction and 25 to 55 wt % of a second polymer fraction, each comprising ethylene, a $C_3$-$C_{10}$ alpha-olefin, and a non-conjugated diene. A method of producing the thermoplastic vulcanizate is also disclosed.

25 Claims, No Drawings

US 8,653,197 B2

THERMOPLASTIC VULCANIZATE COMPOSITION

PRIORITY CLAIM

This application is a continuation of U.S. Ser. No. 11/497,091, filed Aug. 1, 2006, now granted as U.S. Pat. No. 8,178,625, the disclosure of which is incorporated by reference in its entirety.

FIELD OF THE INVENTION

This invention relates to thermoplastic vulcanizates having an improved balance of properties.

BACKGROUND OF THE INVENTION

Thermoplastic vulcanizates comprise finely-divided rubber particles dispersed within a thermoplastic matrix. These rubber particles are crosslinked to promote elasticity. The dispersed rubber phase is typically referred to as the discontinuous phase, and the thermoplastic phase is typically referred to as the continuous phase.

Thermoplastic vulcanizates may advantageously be prepared by dynamically vulcanizing a rubber with a curative agent while the rubber is being mixed with a thermoplastic resin. Factors which influence the physical properties of a thermoplastic vulcanizate include those related to the physical properties of the rubber discontinuous phase, the physical properties of the thermoplastic continuous phase, the size and the concentration of the particles of the discontinuous phase, the presence of fillers, curatives, and other additives present in the composition, and the like.

Physical properties of thermoplastic vulcanizates are often trade-offs between extremes. A need exists in the art for thermoplastic vulcanizate compositions having balanced properties. Ethylene based elastomers such as ethylene-propylene (alpha-olefin)-diene (EPDM) elastomers are generally polymers of very high molecular weight (as measured by their Mooney viscosity), and are often suitable for use in TPV applications. However, high molecular weight EPDM elastomers inherently possess very high viscosities, e.g., Mooney viscosity greater than 200 ML(1+4@125° C.). This inherent characteristic of EPDM results in difficulties related to the processability of these polymers. Such polymers are not processable when having Mooney viscosities above about 100 ML(1+4@125° C.). To remedy the concerns associated with the high viscosity of high molecular weigh EPDM, extender oil is often added to the polymers to the reactor effluent containing the polymers reduce the apparent viscosity. The presence of extender oil may, however, be a detriment to manufacturing capacity since the extender oil would replace some of the rubber capacity of the plant.

The required level of extender oil depends on the molecular weight of the elastomer, but is usually sufficient to reduce the apparent viscosity of the oil extended EPDM to a Mooney viscosity of about 100 ML(1+4@125° C.) or below. Commercially available very high molecular weight EPDMs, which would be useful in TPVs, typically contain from about 50 to about 125 phr extender oil.

An existing challenge is how to produce an EPDM that is lower in molecular weight and oil extension than current high molecular weight rubbers such as commercial EPDM Vistalon® 3666 (available from ExxonMobil Chemical Co.) without sacrificing performance of the TPV. This much sought goal would improve production capacity in terms of net rubber yield as well as rates that are often limited by the high MW and high oil extension. Polymer structures made with conventional technologies during past efforts have not produced an EPDM that was lower in MW (and oil extension) that is able to match or exceed the properties of unimodal high molecular weight rubbers known in the art.

For example, EPDM as disclosed in WO 00/26296 is directed to a metallocene based ethylene-alpha-olefin elastomeric composition made by a series reactor operation in which the high molecular weight component has a Mooney viscosity not exceeding 120, and is present in an amount no greater than 50 weight percent. Solvent utilized in such process is removed from metallocene based processes utilizing flash evaporation of the solvent, wherein reduced pressure is applied to the reaction product. However, at least a portion of the oil (if present) in the reaction product may become entrained in the solvent being removed under reduced pressure, and may be removed along with the solvent. Metallocene based processes thus do not allow for the introduction of extender oil into the final reaction product until after the solvent has been removed by flash evaporation.

Metallocene based processes may thus be limited to a polymer product having an overall Mooney viscosity of less than about 90 ML (1+4@120° C.) in the absence of extender oil, due to the handling characteristics of such polymers including the difficulties of further processing polymers having a Mooney viscosity above about 90 ML (1+4@120° C.). However, polymer compositions having a Mooney viscosity of less than or equal to about 90 ML (1+4@120° C.) in the absence of extender oil have inferior properties.

WO 2003 066725A2 is directed to bimodal EPDM polymer compositions comprising a major polymer fraction having a Mooney viscosity above 120 ML(1+4@ 125° C.), and a minor polymer fraction having a Mooney viscosity of 120 ML(1+4@ 125° C.) or less, where the composition has a tan delta of 0.5 or less (125° C./10.4 rad/s). These compositions are essentially free of extender oil and preferably have a Mooney viscosity below 100 ML(1+4@125° C.) to ensure ease of processability. The compositions are prepared using metallocene catalysts in a series reactor process wherein the high molecular weight component is produced in the first reactor, and the low molecular weight component is produced in the second reactor, both using metallocene catalysts. Both components have relatively narrow molecular weight distributions with a polydispersity index ($M_w/M_n$) of less than 4, preferably less than 3. In addition, both components have a relatively high average branching index factor of greater than 0.7, preferably greater than 0.8, on a scale in which a branching index of 1 represents a linear polymer.

Numerous attempts have been made to produce an EPDM that is lower in molecular weight and oil extension as compared to oil-extended unimodal rubbers (e.g., Vistalon® 3666) to improve plant capacity in terms of net rubber yield, as well as rates of production which are limited by the high molecular weight and high oil extension required by rubbers known in the art. Polymer structures made with the conventional technologies could not produce an EPDM that was lower in molecular weight and lower in oil extension and yet match or exceed the properties of unimodal high molecular weight rubbers in TPV formulations.

SUMMARY OF THE INVENTION

In a first aspect of the present invention, a thermoplastic vulcanizate composition comprising: a dynamically-cured rubber; from about 20 to about 300 parts by weight of a thermoplastic resin per 100 parts by weight dynamically-cured rubber (phr) and from about 50 to about 200 parts by weight of a paraffinic oil per 100 parts by weight rubber; wherein the dynamically-cured rubber comprises a multimodal polymer composition cured with a curing agent, the multimodal polymer composition comprising: 45 to 75 wt % of a first polymer fraction comprising ethylene, a $C_3$-$C_{10}$ alpha-olefin, and a non-conjugated diene, wherein the first polymer fraction has been polymerized in a first reactor in a series of two or more reactors, using a first Ziegler-Natta catalyst system, wherein the first polymer fraction has a Mooney viscosity of greater than or equal to about 150 ML(1+4@125° C.); 25 to 55 wt % of a second polymer fraction comprising ethylene, a $C_3$-$C_{10}$ alpha-olefin, and a non-conjugated diene, wherein the second polymer fraction has been polymerized in the presence of the first polymer fraction in a subsequent reactor in the series of two or more reactors, using a second Ziegler-Natta catalyst system, wherein the second polymer fraction has a Mooney viscosity of greater than or equal to 20 ML(1+4@125° C.), and less than or equal to 120 ML(1+4@125° C.); and from about 10 phr to about 50 phr of an extender oil, wherein the multimodal polymer composition has a number average molecular weight of greater than or equal to about 60,000, and less than or equal to about 350,000 g/mol, and a Mooney viscosity of less than 90 ML(1+4@125° C.).

In another aspect of the present invention, a process for forming a thermoplastic vulcanizate comprises the steps of: dynamically vulcanizing a rubber with a curing agent within a blend comprising the rubber, the curing agent, and a thermoplastic polymer to produce the thermoplastic vulcanizate, wherein the rubber comprises a multimodal polymer composition comprising: 45 to 75 wt % of a first polymer fraction comprising ethylene, a $C_3$-$C_{10}$ alpha-olefin, and a non-conjugated diene, wherein the first polymer fraction has been polymerized in a first reactor of a series of two or more reactors, using a first Ziegler-Natta catalyst system, wherein the first polymer fraction has a Mooney viscosity of greater than or equal to about 150 ML(1+4@125° C.); 25 to 55 wt % of a second polymer fraction comprising ethylene, a $C_3$-$C_{10}$ alpha-olefin, and a non-conjugated diene, wherein the second polymer fraction has been polymerized in the presence of the first polymer fraction, in a subsequent reactor of the series of two or more reactors, using a second Ziegler-Natta catalyst system, wherein the second polymer fraction has a Mooney viscosity of greater than or equal to 20 ML(1+4@125° C.), and less than or equal to 120 ML(1+4@125° C.); and from about 10 to about 50 phr of an extender oil, wherein the multimodal polymer composition has a number average molecular weight of greater than or equal to about 60,000, and less than or equal to about 350,000 g/mol, and a Mooney viscosity of less than 90 ML(1+4@125° C.).

In yet another aspect of the present invention, a thermoplastic vulcanizate composition comprising: a dynamically-cured rubber, from about 20 to about 300 parts by weight of a thermoplastic resin per 100 parts by weight rubber and from about 50 to about 200 parts by weight of additional paraffinic oil per 100 parts by weight rubber, wherein the dynamically cured rubber comprises a multimodal polymer composition cured with a curing agent, wherein the multimodal polymer composition is produced by a process comprising the steps of: adding a first set of monomers comprising ethylene, a $C_3$-$C_{10}$ alpha-olefin, and non-conjugated diene, and a first Ziegler-Natta catalyst system into a first reactor of a series of two or more reactors; polymerizing the first set of monomers to produce a first reactor effluent comprising a first polymer fraction having a Mooney viscosity of greater than or equal to 150 ML(1+4@125° C.); directing the first reactor effluent into a subsequent reactor of the series of two or more reactors; adding a second set of monomers comprising ethylene, a $C_3$-$C_{10}$ alpha-olefin, and non-conjugated diene, and a second Ziegler-Natta catalyst system into the subsequent reactor of the series of two or more reactors; polymerizing the second set of monomers in the presence of the first polymer fraction to produce a second reactor effluent comprising at least a portion of the first polymer fraction and a second polymer fraction having a Mooney viscosity of greater than or equal to 20 ML(1+4@125° C.), and less than or equal to 120 ML(1+4@125° C.); and adding from about 10 phr to about 50 phr extender oil into the second reactor effluent to produce the multimodal polymer composition, wherein the multimodal polymer composition comprises: 45 to 75 wt % of the first polymer fraction; and 25 to 55 wt % of the second polymer fraction; and wherein the multimodal polymer composition has a number average molecular weight of greater than or equal to about 60,000, and less than or equal to about 350,000 g/mol, and a Mooney viscosity of less than or equal to 90 ML(1+4@125° C.) and an inherent viscosity, measured in decalin at 135° C., of from 3 to about 8 dl/g.

DETAILED DESCRIPTION

Various specific embodiments, versions and examples of the present disclosure will now be described, including preferred embodiments and definitions that are adopted herein for purposes of understanding the instant disclosure.

The term "cured composition" (e.g., cured multimodal polymer composition) refers to a composition that has been contacted with a curing agent and subjected to conditions (e.g., temperature, time) required to crosslink at least a portion of the composition. The term cured composition is used interchangeably with the term vulcanized composition.

The term "dynamic vulcanization" refers to a vulcanization or curing process for a rubber contained in a thermoplastic elastomer composition, wherein the rubber is vulcanized, preferably under conditions of high shear, at a temperature above the melting point of the polyolefin component. During dynamic vulcanization, the rubber is simultaneously crosslinked (cured) and dispersed as discrete particles within the polyolefin matrix, although other morphologies may also exist. Dynamic vulcanization is effected by mixing the thermoplastic elastomer components at elevated temperature in conventional mixing equipment such as roll mills, Banbury mixers, Brabender mixers, continuous mixers, mixing extruders, and the like. One method for preparing thermoplastic vulcanizates is described in U.S. Pat. No. 4,594,390, which is incorporated herein by reference, although methods employing low shear rates can also be used.

As used herein, the term "reactor", is defined to include any container(s) in which a chemical reaction occurs. For purposes herein, the numbering scheme for the Periodic Table Groups used are consistent with the numbering used in 63(5) CHEMICAL AND ENGINEERING NEWS 27 (1985). The term polymer may refer to a homopolymer, a copolymer, an interpolymer, a terpolymer, and/or the like. Likewise, a copolymer may refer to a polymer comprising at least two monomers.

When a polymer is referred to as comprising a monomer, the monomer is present in the polymer in the polymerized form of the monomer, or in a derivative form of the monomer. When catalyst components are described as comprising neutral stable forms of the components, it is well understood by one skilled in the art that in some cases, the ionic form of the component is the form that reacts with the monomers to produce polymers.

The term "alkyl" refers to hydrocarbon groups having from 1 to 20 carbon atoms, which may be derived from the corresponding alkane by removing one or more hydrogens from the formula. Examples include a methyl group ($CH_3$), which is derived from methane ($CH_4$), and an ethyl group ($CH_3CH_2$), which is derived from ethane ($CH_3CH_3$).

The term "aryl" refers to a hydrocarbon group comprising 5 to 20 carbon atoms that form a conjugated ring structure characteristic of aromatic compounds. Examples of aryl groups or substituents include benzene, naphthalene, phenanthrene, anthracene, and the like, which possess alternating double bonding ("unsaturation") within a cyclic structure. An aryl group is derived from an aromatic compound by dropping one or more hydrogens from the formula.

The term "substituted alkyl group(s)" refers to replacement of at least one hydrogen atom on an alkyl, alkene, alkyne, or aryl group having 1 to 20 carbon atoms, by at least one substituent. Examples of substituents include halogen (chlorine, bromine, fluorine, or iodine), amino, nitro, sulfoxy (sulfonate or alkyl sulfonate), thiol, alkylthiol, hydroxy, alkoxy, and straight, branched, or cyclic alkyls, alkenes, or alkynes having 1 to 20 carbon atoms. Examples of alkyl substituents include methyl, ethyl, propyl, tert-butyl, isopropyl, isobutyl, and the like. Examples of alkoxy substituents include methoxy, ethoxy, propoxy, isopropoxy, butoxy, isobutoxy, secondary butoxy, tertiary butoxy, pentyloxy, isopentyloxy, hexyloxy, heptyloxy, octyloxy, nonyloxy, and decyloxy. The term haloalkyl refers to straight or branched chain alkyl groups having 1 to 20 carbon atoms in which at least one hydrogen atom is substituted by at least one halogen. The term "hydrocarbyl" refers to any combination of alkyl, aryl, substituted alkyl, or the like.

As used herein, Mooney viscosity is reported using the format: Rotor ([pre-heat time, min.]+[shearing time, min.] @ measurement temperature, ° C.), such that ML (1+4 @125° C.) indicates a Mooney viscosity determined using the ML or large rotor according to ASTM D1646-99, for a pre-heat time of 1 minute and a shear time of 4 minutes, at a temperature of 125° C.

Unless otherwise specified, Mooney viscosity is reported herein as ML(1+4 @125° C.) in Mooney units according to ASTM D-1646. However, Mooney viscosity values greater than about 100 cannot generally be measured under these conditions. In this event, a higher temperature can be used (i.e., 150° C.), with eventual longer shearing time (i.e., 1+8@125° C. or 150° C.) More preferably, the Mooney measurement for purposes herein is carried out using a non-standard small rotor. The non-standard rotor design is employed with a change in the Mooney scale that allows the same instrumentation on the Mooney instrument to be used with polymers having a Mooney viscosity over about 100 ML(1+4@125° C.). For purposes herein, this modified Mooney determination is referred to as MST—Mooney Small Thin.

ASTM D1646-99 prescribes the dimensions of the rotor to be used within the cavity of the Mooney instrument. This method allows for both a large and a small rotor, differing only in diameter. These different rotors are referred to in ASTM D1646-99 as ML (Mooney Large) and MS (Mooney Small). However, EPDM can be produced at such high molecular weight that the torque limit of the Mooney instrument can be exceeded using these standard prescribed rotors. In these instances, the test is run using the MST rotor that is both smaller in diameter and thinner. Typically, when the MST rotor is employed, the test is also run at different time constants and temperatures. The pre-heat time is changed from the standard 1 minute to 5 minutes, and the test is run at 200° C. instead of the standard 125° C. The value obtained under these modified conditions is referred to herein as MST (5+4@200° C.). Note: the run time of 4 minutes at the end of which the Mooney reading is taken remains the same as the standard conditions. One MST point is approximately equivalent to 5 ML points when MST is measured at (5+4@200° C.) and ML is measured at (1+4@125° C.). Accordingly, for the purposes of an approximate conversion between the two scales of measurement, the MST (5+4@200° C.) Mooney value is multiplied by 5 to obtain an approximate ML(1+4 @125° C.) value equivalent. The MST rotor used herein was prepared and utilized according to the following specifications:

The rotor should have a diameter of 30.48+/−0.03 mm and a thickness of 2.8+/−0.03 mm (determined from the tops of serrations) and a shaft of 11 mm or less in diameter.

The rotor should have a serrated face and edge, with square grooves of about 0.8 mm width and depth of about 0.25-0.38 mm cut on 1.6 mm centers. The serrations will consist of two sets of grooves at right angles to each other thereby forming a square crosshatch.

The rotor shall be positioned in the center of the die cavity such that the centerline of the rotor disk coincides with the centerline of the die cavity to within a tolerance of +/−0.25 mm. A spacer or a shim may be used to raise the shaft to the midpoint, consistent with practices typical in the art for Mooney determination.

The wear point (cone shaped protuberance located at the center of the top face of the rotor) shall be machined off flat with the face of the rotor.

Mooney viscosities of the multimodal polymer composition may be determined on blends of polymers herein. The Mooney viscosity of a particular component of the blend is obtained herein using the relationship shown in (1):

$$\log ML = n_A \log ML_A + n_B \log ML_B \qquad (1)$$

wherein all logarithms are to the base 10; ML is the Mooney viscosity of a blend of two polymers A and B each having individual Mooney viscosities $ML_A$ and $ML_B$, respectively; $n_A$ represents the wt % fraction of polymer A in the blend; and $n_B$ represents the wt % fraction of the polymer B in the blend.

In the instant disclosure, Equation (1) has been used to determine the Mooney viscosity of blends comprising a high Mooney viscosity polymer (A) and a low Mooney viscosity polymer (B), which have measurable Mooney viscosities under (1+4@125° C.) conditions. Knowing ML, $ML_A$ and $n_A$, the value of $ML_B$ can be calculated.

However, for high Mooney viscosity polymers (i.e., Mooney viscosity greater than 100 ML(1+4@125° C.), $ML_A$ is measured using the MST rotor as described above. The Mooney viscosity of the low molecular weight polymer in the blend is then determined using Equation 1 above, wherein $ML_A$ is determined using the following correlation (2):

$$ML_A(1+4@125° C.)=5.13*MST_A(5+4@200° C.) \qquad (2).$$

The relative degree of branching in the instant polymers is determined using an average branching index factor (BI). This factor is calculated using a series of four laboratory measurements of polymer properties in solution, as disclosed in VerStrate, Gary, "Ethylene-Propylene Elastomers", Encyclopedia of Polymer Science and Engineering, 6, 2nd edition (1986), which is incorporated by reference herein. The four measurements are:

(i) weight average molecular weight ($M_w$) measured using a low angle laser light scattering detector (LALLS) in combination with Gel Permeation Chromatography (GPC), abbreviated herein as "$M_{w\ GPC\ LALLS}$";

(ii) weight average molecular weight ($M_w$) determined using a differential refractive index (DRI) detector in combination with GPC, and abbreviated herein as "$M_{w\ GPC\ DRI}$";

(iii) viscosity average molecular weight ($M_v$) determined using a differential refractive index (DRI) detector in combination with GPC, and abbreviated herein as "$M_{v\ GPC\ DRI}$", and (iv) intrinsic viscosity (also referred to in the art as inherent viscosity, and abbreviated IV) measured in decalin at 135° C. The first three measurements (i, ii, and iii) are obtained via GPC using a filtered dilute solution of the polymer in trichlorobenzene.

The average branching index factor (BI) as disclosed herein is defined by Equation (3) as:

$$BI = \frac{M_{v,br} X M_{w,GPC\ DRI}}{M_{w,GPC\ LALLS} X M_{v,GPC\ DRI}} \quad (3)$$

where, $M_{v,br}=(IV/k)^{1/a}$; wherein "k" is a measured constant from a linear polymer as described by Paul J. Flory in PRINCIPLES OF POLYMER CHEMISTRY 310 (1953), and the summation is over all the slices in the distribution, and wherein "a" is the Mark-Houwink constant (=0.759 for ethylene, propylene diene elastomeric polymers in decalin at 135° C.).

From equation (3) it follows that the average branching index factor for a linear polymer is 1.0. For branched polymers, the extent of branching is defined relative to a linear polymer. Since at a constant number average molecular weight $M_n$, $(M_w)_{branch}>(M_w)_{linear}$, BI for branched polymers is less than 1.0, and a smaller BI value denotes a higher level of branching. In instances wherein measuring IV in decalin is impossible, IV may be measured for comparison to the instant disclosure using a viscosity detector in tandem with DRI and LALLS detectors in a so-called GPC-3D instrument. In this case, "k" and "a" values are selected which are appropriate for the GPC solvent used in making the determination.

As used herein, molecular weight distribution (MWD), also referred to as polydispersity, represents the weight average molecular weight divided by the number average molecular weight ($M_w/M_n$) of the polymer. In the instant disclosure, $M_w$ and $M_n$ are determined using Gel Permeation Chromatography on a Waters 150 gel permeation chromatograph equipped with a differential refractive index (DRI) detector and a Chromatix KMX-6 using an on-line light scattering photometer. The determination is made at 135° C. using 1,2,4-trichlorobenzene as the mobile phase and one of a Shodex (Showa Denko America, Inc) polystyrene gel column numbered 802, 803, 804 or 805. This technique is discussed in detail in LIQUID CHROMATOGRAPHY OF POLYMERS AND RELATED MATERIALS III, 207 (J. Cazes ed., Marcel Dekker, 1981), which is incorporated herein by reference. In the data disclosed herein, corrections for column spreading are not employed.

$M_w/M_n$ is preferably calculated from elution times. These numerical analyses are performed using commercially available Beckman/CIS customized LALLS software in conjunction with the standard Gel Permeation package. Calculations involved in the characterization of polymers by $^{13}C$ NMR follow the work of F. A. Bovey in "Polymer Conformation and Configuration" Academic Press, New York, 1969. Reference to $M_w/M_n$ implies that the $M_w$ is the value reported using the LALLS detector and $M_n$ is the value reported using the DRI detector.

The multimodal polymer compositions disclosed herein are multimodal, meaning the polymers comprise a combination of at least two fractions, referred to as a first polymer fraction and as a second polymer fraction. However, it is noted that the numbering of the fractions are for evidentiary purposes only and in the absence of any direct indication otherwise, the numbering of the fractions does not, and is not intended to, refer to any order in which the fractions are produced, blended, or otherwise included into the multimodal polymer compositions disclosed herein.

The multimodality of the multimodal polymer compositions may manifest itself as two distinct peaks, or as a main peak and a shoulder peak in the $M_{w\ GPC\ LALLS}$ signal. In an embodiment, the multimodality may be caused by the blending of a high molecular weight fraction with a low molecular weight fraction component, which results from sequential polymerization. In another embodiment, physical blending techniques well known in the art may be employed to produce the multimodal polymer compositions described herein.

For purposes herein, suitable ranges of various properties and parameters as discussed herein include combinations of any lower and any upper limit disclosed for that property/parameter. Also, when an embodiment which comprises a particular component or components, that embodiment may also consist essentially of that component or components, or may consist of that component or components.

Thermoplastic Vulcanizate Composition

The thermoplastic vulcanizate composition of the instant disclosure includes a rubber discontinuous phase comprising a multimodal polymer composition, dispersed within a thermoplastic continuous phase. The thermoplastic vulcanizate may also include one or more additives including additional oil.

Discontinuous Phase

The discontinuous phase of the instant thermoplastic vulcanizate composition comprises a dynamically cured multimodal polymer composition, and may further comprise one or more additional elastomeric compounds and/or one or more additives.

Multimodal Polymer Composition

The multimodal polymer compositions of this disclosure comprise multimodal polymers comprising units derived from ethylene, alpha-olefin(s) and diene. These polymers are referred to herein as EPDM-type polymers, as EPDM terpolymers, or as EPDM polymers, interchangeably.

The alpha-olefin of the EPDM polymer is preferably one or more of a $C_3$ to $C_8$ alpha-olefin, more preferably propylene or butene, most preferably propylene. The diene of the EPDM polymer is preferably a non-conjugated diene. More preferably, the diene is a non-conjugated diene selected from the group consisting of 5-ethylidene-2-norbornene (ENB), 1,4-hexadiene, 1,6-octadiene, 5-methyl-1,4-hexadiene, 3,7-dimethyl-1,6-octadiene, dicyclopentadiene (DCPD), norbornadiene, 5-vinyl-2-norbornene (VNB), divinylbenzene (DVB), and combinations thereof. The most preferred diene for use herein is ENB.

In a preferred embodiment, the multimodal polymer composition comprises an EPDM polymer comprising a bimodal composition. The bimodal composition comprises a high molecular weight first polymer fraction, and a low molecular weight second polymer fraction. In an embodiment, the multimodal polymer composition disclosed herein also comprises an extender oil, as described in detail herein.

The multimodal polymer composition preferably comprises between about 45 wt % and about 75 wt % of the first polymer fraction, based on the total weight of the first polymer fraction and the second polymer fraction (or fractions) present in the composition. Within this range, the multimodal polymer composition preferably comprises about 45-55 wt % of the first polymer fraction, with the remainder of the polymer in the composition comprising the second polymer fraction.

In a preferred embodiment, the weight percent (based on the total polymer weight) of ethylene in the first polymer fraction and the weight percent of ethylene in the second polymer fraction differ by no more than about 20 wt %, even more preferably by no more than about 10 wt %. Also, in a preferred embodiment, the weight percent diene in each fraction differs by no more than about 8 wt %, preferably by no more than about 3 wt %, more preferably by no more than about 2 wt %, and most preferably by no more than about 1 wt % diene.

High Molecular Weight First Polymer Fraction

In an embodiment, the multimodal polymer composition comprises a first polymer fraction having a Mooney viscosity (determined using the MST (5+4 @200° C.) and converted to the ML(1+4 @125° C.) value equivalent) of from 150 to 500 ML(1+4 @125° C.), and from 200 to 450 ML(1+4 @125° C.) in another embodiment, and from 250 to 400 ML(1+4 @125° C.) in yet another embodiment, wherein a desirable range may comprise any combination of any upper limit with any lower limit described herein.

The first polymer fraction possesses a $M_n$ between about 60,000 and 500,000 g/mol in one embodiment, and from 80,000 to 400,000 in another embodiment, and from 100,000 to 300,000 in yet another embodiment, wherein a desirable range may comprise any combination of any upper limit with any lower limit described herein.

The first polymer fraction possesses a MWD between about 2 and 10 in one embodiment, and from 2.5 to 9 in another embodiment, and from 3 to 8 in yet another embodiment, wherein a desirable range may comprise any combination of any upper limit with any lower limit described herein.

The first polymer fraction possesses a BI between about 0.3 and 1 in one embodiment, and from 0.4 to 0.95 in another embodiment, and from 0.5 to 0.9 in yet another embodiment, wherein a desirable range may comprise any combination of any upper limit with any lower limit described herein.

The first polymer fraction possesses about 35 to about 90 mol % ethylene, based on the total number of moles of the first polymer fraction, in one embodiment, and from 45 to 80 mol % in another embodiment, and from 55 to 75 mol % in yet another embodiment, wherein a desirable range may comprise any combination of any upper limit with any lower limit described herein.

The first polymer fraction possesses about 10 to about 65 mol % alpha-olefin, based on the total number of moles of the first polymer fraction, in one embodiment, and from 15 to 60 mol % in another embodiment, and from 25 to 45 mol % in yet another embodiment, wherein a desirable range may comprise any combination of any upper limit with any lower limit described herein.

In an embodiment, the alpha-olefin is preferably propylene. The first polymer fraction possesses about 15 to about 70 mol % propylene, based on the total number of moles of the first polymer fraction, in one embodiment, and from 20 to 60 mol % in another embodiment, and from 30 to 45 mol % in yet another embodiment, wherein a desirable range may comprise any combination of any upper limit with any lower limit described herein.

The first polymer fraction preferably comprises about 0.1 to about 10 wt % (about 0.03 to about 3 mol %) diene, based on the total weight of the first polymer fraction. Within this range, the first polymer fraction preferably comprises at least 2.5 wt % (about 0.7 mol %), with at least 3 wt % (about 0.85 mol %) being preferred, and at least 4 wt % (about 1.15 mol %) diene being more preferred. The first polymer fraction also preferably comprises less than 8 wt % (about 2.3 mol %) diene, with less than 7 wt % (about 2 mol %) diene being more preferred, wherein a desirable range may comprise any combination of any upper limit with any lower limit described herein.

Low Molecular Weight Second Polymer Fraction

The multimodal polymer composition also comprises at least one second polymer fraction. When the second polymer fraction is combined with the polymer fraction prior to the measurement of properties, the second polymer fraction properties can only be inferred from first polymer fraction properties and combined blend properties.

The second polymer fraction possesses a Mooney viscosity of from 10 to 120 ML(1+4 @125° C.), and from 20 to 100 ML(1+4 @125° C.) in another embodiment, and from 40 to 70 ML(1+4 @125° C.) in yet another embodiment, wherein a desirable range may comprise any combination of any upper limit with any lower limit described herein.

The second polymer fraction possesses a $M_n$ between about 20,000 and 100,000 g/mol in one embodiment, and from 30,000 to 90,000 in another embodiment, and from 40,000 to 80,000 in yet another embodiment, wherein a desirable range may comprise any combination of any upper limit with any lower limit described herein.

The second polymer fraction possesses a $M_n$ between about 60,000 and 500,000 g/mol in one embodiment, and from 80,000 to 400,000 in another embodiment, and from 100,000 to 300,000 in yet another embodiment, wherein a desirable range may comprise any combination of any upper limit with any lower limit described herein.

The second polymer fraction possesses a MWD between about 2 and 10 in one embodiment, and from 2.5 to 9 in another embodiment, and from 3 to 8 in yet another embodiment, wherein a desirable range may comprise any combination of any upper limit with any lower limit described herein.

The second polymer fraction possesses a BI between about 0.3 and 1 in one embodiment, and from 0.4 to 0.95 in another embodiment, and from 0.5 to 0.9 in yet another embodiment, wherein a desirable range may comprise any combination of any upper limit with any lower limit described herein.

The second polymer fraction possesses about 35 to about 90 mol % ethylene, based on the total number of moles of the second polymer fraction, in one embodiment, and from 45 to 80 mol % in another embodiment, and from 55 to 75 mol % in yet another embodiment, wherein a desirable range may comprise any combination of any upper limit with any lower limit described herein.

The second polymer fraction possesses about 10 to about 65 mol % alpha-olefin, based on the total number of moles of the second polymer fraction, in one embodiment, and from 15 to 60 mol % in another embodiment, and from 25 to 45 mol % in yet another embodiment, wherein a desirable range may comprise any combination of any upper limit with any lower limit described herein.

In an embodiment, the alpha-olefin is preferably propylene. The second polymer fraction possesses about 15 to about 70 mol % propylene, based on the total number of moles of the second polymer fraction, in one embodiment, and from 20 to 60 mol % in another embodiment, and from 30 to 45 mol % in yet another embodiment, wherein a desirable range may comprise any combination of any upper limit with any lower limit described herein.

The second polymer fraction possesses about 0.1 to about 10 wt % diene (about 0.03 to about 3 mol %), based on the total weight percent (moles) of the second polymer fraction, in one embodiment, and from 2.5 to 8 wt % in another embodiment, and from 3 to 7 wt % in yet another embodiment, wherein a desirable range may comprise any combination of any upper limit with any lower limit described herein.

Multimodal Polymer Composition Extender Oil and Additives

The instant multimodal polymer composition comprises an extender oil, and may further comprise one or more additives including, but not limited to, carbon black, plasticizers, processing aids such as fatty acids, waxes, and the like, antioxidants, curatives, fillers including calcium carbonate, clay, silica and the like, antiozonants, tackifiers, scorch inhibiting agents, and other additives known in the art.

Extender Oils

The terms "oil" and "extender oil" are used interchangeably herein, and refer to a compound comprising carbon and hydrogen, which is a liquid at 25° C. Examples of extender oils include various types of paraffins and paraffin blends, dearomaticized aliphatic hydrocarbons, high purity hydrocarbon fluids, polyalphaolefins, polybutenes, mineral oils, and the like.

Paraffins

In an embodiment, the extender oil may comprise, or may consist essentially of one or more paraffins. For purposes of the instant disclosure, the term "paraffin" includes all isomers such as normal or linear paraffins (n-paraffins), branched paraffins, also referred to as isoparaffins, and cyclic paraffins, preferably cyclic aliphatic paraffins. Paraffins may be derived synthetically by means known in the art, or may be refined from crude oil in such a way as to meet the requirements of an extender oil as described herein. It is to be understood that the classes of materials described herein that are useful as extender oils can be utilized alone, or admixed with other extender oils, other plasticizers, and the like, in order to obtain the recited properties.

In an embodiment, an extender oil may comprise, or may consist essentially of one or more $C_6$ to $C_{200}$ paraffins. In a preferred embodiment, the extender oil may comprise $C_8$ to $C_{100}$ paraffins, more preferably $C_6$ to $C_{200}$ paraffins, more preferably $C_8$ to $C_{100}$ paraffins.

A preferred extender oil or blend thereof may comprise a paraffin having one or more of the following properties:

a distillation range as determined by ASTM D 86 having a difference between the upper temperature and the lower temperature of 40° C. or less, preferably 35° C. or less, preferably 30° C. or less, preferably 25° C. or less, preferably 20° C. or less, preferably 15° C. or less, preferably 10° C. or less, preferably 6 to 40° C., preferably 6 to 30° C.; and/or an initial boiling point as determined by ASTM D 86 greater than 50° C., preferably greater than 100° C., preferably greater than 120° C., preferably greater than 130° C., preferably greater than 140° C., preferably greater than 150° C., preferably greater than 160° C., preferably greater than 170° C., preferably greater than 180° C., preferably greater than 190° C., preferably greater than 200° C., preferably greater than 210° C., preferably greater than 220° C., preferably greater than 230° C., preferably greater than 240° C.; and/or a pour point of 10° C. or less (as determined by ASTM D 97), preferably 0° C. or less, preferably −5° C. or less, preferably −15° C. or less, preferably −40° C. or less, preferably −50° C. or less, preferably −60° C. or less; and/or a specific gravity (ASTM D 4052, 15.6° C.) of less than 0.88, preferably less than 0.85, preferably less than 0.80, preferably less than 0.75, preferably less than 0.70, preferably 0.65 to 0.88, preferably 0.70 to 0.86, preferably 0.75 to 0.85, preferably 0.79 to 0.85, preferably 0.80 to 0.84; and/or a final boiling point as determined by ASTM D 86 of less than 700° C., preferably 115° C. to 500° C., preferably 200° C. to 450° C., preferably 250° C. to 400° C.; and/or a weight average molecular weight ($M_w$) less than 21,000 g/mol determined by GPC, preferably 100 to 2000, preferably 150 to 1500, more preferably 200 to 1000; and/or a number average molecular weight ($M_n$) of 100 to 2000 g/mol determined by GPC, preferably 150 to 1500, more preferably 200 to 1000; and/or a flash point as measured by ASTM D 56 of greater than −30° C., preferably −30° C. to 150° C., and/or a dielectric constant at 20° C. of less than 3.0, preferably less than 2.8, preferably less than 2.5, preferably less than 2.3, preferably less than 2.1; and/or a density (ASTM 4052, 15.6/15.6° C.) of less than 0.90 g/cm³, preferably 0.70 to 0.83; and/or a viscosity (ASTM 445, 25° C.) of 0.5 to 20 cSt at 25° C.; and/or a carbon number of 6 to 150, preferably 7 to 100, more preferably 10 to 30, more preferably 12 to 25; and/or a kinematic viscosity ("KV") of 2 centi Stokes (cSt) or less at 100° C., preferably 1.5 cSt or less, preferably 1.0 cSt or less, preferably 0.5 cSt or less, as determined according to ASTM D 445; and/or a glass transition temperature (Tg) according to ASTM E 1356 of less than 30° C. preferably less than 20° C., more preferably less than 10° C., more preferably less than 0° C., more preferably less than −5° C., more preferably less than −10° C., more preferably less than −15° C., still more preferably a Tg that cannot be determined according to ASTM E 1356.

n-Paraffins

Extender oils may comprise linear or normal paraffins (n-paraffins). Preferred n-paraffins comprise at least 50 wt %, preferably at least 60 wt %, preferably at least 70 wt %, preferably at least 80 wt %, preferably at least 90 wt %, preferably at least 95 wt % preferably essentially 100 wt % of $C_5$ to $C_{25}$ n-paraffins, more preferably $C_5$ to $C_{20}$ n-paraffins, more preferably $C_5$ to $C_{15}$ n-paraffins. Preferred n-paraffins may also comprise less than 0.1%, preferably less than 0.01% aromatics. In a preferred embodiment, the n-paraffins may have:

a KV of 2 cSt or less at 100° C.; and/or a distillation range of 30° C. or less, preferably 20° C. or less; and/or an initial boiling point greater than 150° C., preferably greater than 200° C.; and/or a specific gravity of 0.65 to 0.85, more preferably 0.70 to 0.80, more preferably 0.75 to 0.80; and/or a flash point greater than 60° C., more preferably greater than 90° C., more preferably greater than 100° C., still more preferably greater than 120° C. Examples of suitable n-paraffins are commercially available under the tradename Norpar® (ExxonMobil Chemical Company, Houston Tex.).

Isoparaffins

The extender oil may comprise a branched paraffin, also referred to as an isoparaffin. By isoparaffin it is meant that a paraffin chain possess $C_1$ to $C_{10}$ alkyl branching along at least a portion of the paraffin chain. More particularly, the isoparaffins are saturated aliphatic hydrocarbons whose molecules have at least one carbon atom bonded to at least three other carbon atoms or at least one side chain (i.e., a molecule having one or more tertiary or quaternary carbon atoms), and preferably wherein the total number of carbon atoms per molecule is in the range between 6 to 50, more preferably between 10 and 24, still more preferably from 10 to 15. Various isomers of each carbon number may be present. Suitable isoparaffins for use as extender oils may also include cycloparaffins having branched side chains. Cycloparaffins may also exist as a minor component of a particular isoparaffin.

The extender oil may comprise at least 50 wt %, preferably at least 60 wt %, preferably at least 70 wt %, preferably at least 80 wt %, preferably at least 90 wt %, preferably at least 95 wt % preferably essentially 100 wt % of $C_6$ to $C_{150}$ isoparaffins. More preferably, the extender oil comprises $C_6$ to $C_{100}$ isoparaffins, more preferably $C_6$ to $C_{25}$ isoparaffins, more preferably $C_8$ to $C_{20}$ isoparaffins.

Preferred isoparaffins may possess: a density of 0.70 to 0.83 g/cm$^3$; and/or a pour point of −40° C. or less, preferably −50° C. or less; and/or a viscosity (ASTM 445, 25° C.) of 0.5 to 20 cSt at 25° C.; and/or a weight average molecular weight ($M_w$) of 100 to 300 g/mol determined by GPC.

The isoparaffins may include greater than 50 wt % (by total weight of the isoparaffin) mono-methyl species, for example, 2-methyl, 3-methyl, 4-methyl, 5-methyl or the like, with minimum formation of branches with substituent groups of carbon number greater than 1, (e.g., ethyl, propyl, butyl and the like), based on the total weight of isoparaffins in the extender oil. In one embodiment, the isoparaffin includes greater than 70 wt % mono-methyl species, based on the total weight of the isoparaffin present.

Preferably, the isoparaffin has a boiling point of from 100° C. to 350° C., more preferably 110° C. to 320° C. In preparing different grades of isoparaffin, a paraffinic mixture may be fractionated into cuts having narrow boiling ranges, for example, of about 35° C.

Suitable isoparaffins are commercially available under the tradename Isopar® (ExxonMobil Chemical Company, Houston Tex.), and are described in, for example, U.S. Pat. No. 6,197,285 (column 5, lines 1-18), U.S. Pat. Nos. 3,818,105 and 3,439,088, and sold commercially as the Isopar® series of isoparaffins. Other suitable isoparaffins for use as extender oils are commercially available under the trade names Shellsol® (by Shell Chemical Co.), Soltrol® (by Chevron Phillips) and Sasol® (by Sasol Limited). Shellsol® is a product of the Royal Dutch/Shell Group of Companies, for example Shellsol TM (boiling point=215-260° C.). Soltrol is a product of Chevron Phillips Chemical Co. LP, for example Soltrol 220 (boiling point=233-280° C.). Sasol is a product of Sasol Limited (Johannesburg, South Africa), for example Sasol LPA-210 and Sasol-47 (boiling point=238-274° C.).

Paraffin Blends

In another embodiment, the extender oil may comprise a paraffin blend comprising a mixture or blend of two or more cyclic, branched, or normal paraffins. Preferred blends have a KV of 2 cSt or less at 100° C. Paraffins in the blends preferably comprise from 6 to 50 carbon atoms, more preferably 10 to 24 carbon atoms. The paraffin blends may have a branch paraffin to n-paraffin molar ratio (moles branched paraffin: moles n-paraffin) of 0.5:1 to 9:1, preferably 1:1 to 4:1, based on the total moles of paraffin present in the blend.

The paraffin blend may include isoparaffins having greater than 50 wt % (by total weight of the blend) mono-methyl species, for example, 2-methyl, 3-methyl, 4-methyl, 5-methyl or the like, with minimum formation (i.e., less than 10 wt %) of branches with substituent groups of carbon number greater than 1, (e.g., ethyl, propyl, butyl and the like), based on the total weight of isoparaffins in the extender oil. In one embodiment, the isoparaffins of the composition contain greater than 70 wt % of the mono-methyl species, based on the total weight of the isoparaffins present in the mixture or blend. Preferably, the paraffin blend has a boiling point of 100° C. to 350° C., more preferably 110° C. to 320° C.

Dearomaticized Aliphatic Hydrocarbon

In an embodiment, the extender oil may comprise a dearomaticized aliphatic hydrocarbon, which comprises normal paraffins, isoparaffins and/or cycloparaffins. Preferred dearomaticized aliphatic hydrocarbons have a KV of 2 cSt or less at 100° C., and preferably comprise at least 50 wt %, preferably at least 60 wt %, preferably at least 70 wt %, preferably at least 80 wt %, preferably at least 90 wt %, preferably at least 95 wt %, preferably essentially 100 wt % of dearomaticized aliphatic hydrocarbon.

Preferred dearomaticized aliphatic hydrocarbons may include a mixture of $C_4$ to $C_{25}$ normal paraffins, isoparaffins and cycloparaffins, more preferably $C_5$ to $C_{18}$, still more preferably $C_5$ to $C_{12}$. Preferred dearomaticized aliphatic hydrocarbons may contain less than 0.1 wt %, preferably less than 0.01 wt % aromatics, based on the total weight of the dearomaticized aliphatic hydrocarbon.

In a preferred embodiment the dearomaticized aliphatic hydrocarbon may have: a distillation range of 30° C. or less, preferably 20° C. or less; and/or an initial boiling point greater than 50° C., preferably greater than 100° C., preferably greater than 200° C.; and/or a specific gravity (15.6° C.) of 0.65 to 0.85, more preferably 0.70 to 0.85, more preferably 0.75 to 0.85, still more preferably 0.80 to 0.85; and/or a flash point greater than 60° C., more preferably greater than 90° C., more preferably greater than 100° C., still more preferably greater than 110° C.

Suitable dearomaticized aliphatic hydrocarbons are commercially available under the tradename Exxsol® (ExxonMobil Chemical Company, Houston Tex.).

High Purity Hydrocarbon Fluids

The extender oil of the present invention may comprise a "high purity" hydrocarbon fluid, preferably comprising one or more paraffins having 6 to 1500 carbon atoms, preferably 8 to 1000 carbon atoms, preferably 10 to 500 carbon atoms, preferably 12 to about 200 carbon atoms, preferably 14 to 150 carbon atoms, preferably 16 to 100 carbon atoms. The high purity hydrocarbon fluid composition may have an isoparaffin:n-paraffin ratio of about 0.5:1 to about 9:1, preferably about 1:1 to about 4:1. The isoparaffins of the "high purity" hydrocarbon fluid composition may contain greater than fifty percent mono-methyl species, e.g., 2-methyl, 3-methyl, 4-methyl, 5-methyl or the like, with minimum formation of branches with substituent groups of carbon number greater than 1, i.e., ethyl, propyl, butyl or the like, based on the total weight of isoparaffins in the mixture. Preferably, the isoparaffins of the "high purity" hydrocarbon fluid composition contain greater than 70 percent of the mono-methyl species, based on the total weight of the composition.

A preferred high purity hydrocarbon fluid may have: a KV at 25° C. of 1 to 100,000 cSt, preferably 10 cSt to 2000 cSt; and/or a KV at 40° C. of 1 to 30,000 cSt, preferably 10 cSt to 2000 cSt; and/or a pour point below −20° C., more preferably below −30° C., more preferably from about −20° C. to about −70° C.

In a preferred embodiment, a high purity hydrocarbon fluid may comprise paraffins having:

a number average molecular weight of 500 to 21,000 g/mol; and/or less than 10% side chains having 4 or more carbons, preferably less than 8 wt %, preferably less than 5 wt %, preferably less than 3 wt %, preferably less than 2 wt %, preferably less than 1 wt %, preferably less than 0.5 wt %, preferably less than 0.1 wt %, preferably less than 0.01 wt %, preferably less than 0.001 wt %; and/or at least 1 or 2 carbon branches present at 15 wt % or more, preferably 20 wt % or more, preferably 25 wt % or more, preferably 30 wt % or more, preferably 35 wt % or more, preferably 40 wt % or more, preferably 45 wt % or more, preferably 50 wt % or more; and/or less than 2.5 wt % cyclic paraffins, preferably less than 2 wt %, preferably less than 1 wt %, preferably less than 0.5 wt %, preferably less than 0.1 wt %, preferably at less than 0.01 wt %, preferably less than 0.001 wt %.

In another preferred embodiment, a high purity hydrocarbon fluid may comprise paraffins having: a KV of 2 cSt or more at 100° C.; and/or a viscosity index of 120 or more, preferably 130 or more, preferably 140 or more, preferably 150 or more, preferably 170 or more, preferably 190 or more, preferably 200 or more, preferably 250 or more, preferably 300 or more; and/or a mixture of paraffins of carbon number ranging from about $C_8$ to $C_{20}$; and/or a molar ratio of isoparaffins to n-paraffins of about 0.5:1 to about 9:1; and/or greater than 50 percent of mono-methyl species, based on the total weight of the isoparaffins; and/or a pour point of about −20° F. to about −70° F.; and/or a kinematic viscosities at 25° C. of about 1 cSt to about 10 cSt; and/or a carbon number of $C_{10}$ to about $C_{16}$; and/or greater than 70 percent mono-methyl species; and/or a boiling temperature of about 320° F. to about 650° F., more preferably of about 350° F. to about 550° F.

In a preferred embodiment, the high purity hydrocarbon fluid comprises a mixture of paraffins having a carbon number of $C_{10}$ to about $C_{16}$; contains greater than 70 percent mono-methyl species; has a boiling temperature of about 350° F. to about 550° F., and has a molar ratio of isoparaffins to n-paraffins of about 1:1 to about 4:1.

The high purity hydrocarbon fluid may also be derived from a Fischer-Tropsch process, such as those disclosed in U.S. Pat. No. 5,906,727.

Polyalphaolefins

The extender oil may comprise a Poly-Alpha-Olefin (PAO), comprising oligomers of branched and/or linear alpha-olefins. PAOs useful in the present invention comprise $C_{20}$ to $C_{1500}$ paraffins, preferably $C_{40}$ to $C_{1000}$ paraffins, preferably $C_{50}$ to $C_{750}$ paraffins, preferably $C_{50}$ to $C_{500}$ paraffins. Preferred PAO's comprise linear alpha-olefins having 5 to 14 carbon atoms, more preferably 6 to 12 carbon atoms, more preferably 8 to 12 carbon atoms, still more preferably an average of about 10 carbon atoms.

In an embodiment, PAO's may include dimers, trimers, tetramers, pentamers, and the like of $C_5$ to $C_{14}$ alpha-olefins, preferably $C_6$ to $C_{12}$ alpha-olefins, more preferably $C_8$ to $C_{12}$ alpha-olefins. Suitable alpha-olefins include 1-pentene, 1-hexene, 1-heptene, 1-octene, 1-nonene, 1-decene, 1-undecene and/or 1-dodecene.

In a preferred embodiment, the alpha-olefin is 1-decene, and the extender oil includes a mixture of dimers, trimers, tetramers and pentamers (and higher) of 1-decene. Preferred PAO's are described more particularly in, for example, U.S. Pat. No. 5,171,908, and U.S. Pat. No. 5,783,531 and in SYNTHETIC LUBRICANTS AND HIGH-PERFORMANCE FUNCTIONAL FLUIDS 1-52 (Leslie R. Rudnick & Ronald L. Shubkin, ed. Marcel Dekker, Inc. 1999).

Preferred PAO's comprise:

a kinematic viscosity at 100° C. of 10 cSt or more, more preferably 30 cSt or more, preferably 50 cSt or more, preferably 80 cSt or more, preferably 110 or more, preferably 150 cSt or more, preferably 200 cSt or more, preferably 500 cSt or more, preferably 750 or more, preferably 1000 cSt or more, preferably 1500 cSt or more, preferably 2000 cSt or more, still more preferably 2500 cSt or more, preferably 10 cSt to 3000 cSt, preferably 10 cSt to 1000 cSt, still more preferably 10 cSt to 40 cSt; a viscosity at 100° C. of 0.1 to 3000 cSt, more preferably 0.5 to 1000 cSt, more preferably 1 to 250 cSt, more preferably 1 to 200 cSt, more preferably 10 to 500, more preferably 0.1 to 150 cSt, still more preferably less than 2 cSt; and/or a viscosity index of 90 or more, more preferably 100 or more, more preferably 105 or more, more preferably 110 or more, more preferably 115 or more, more preferably 120 or more, more preferably 125 or more, more preferably 130 or more, more preferably 140 or more, more preferably 150 or more, more preferably 190 or more, more preferably 200 or more, more preferably 250 or more, still more preferably 300 or more, more preferably 90 to 400, still more preferably 120 to 350; and/or a number average molecular weight ($M_n$) of 100 to 21,000, more preferably 200 to 10,000, more preferably 200 to 7,000, more preferably 200 to 2,000, still more preferably 200 to 500 g/mole; and/or a weight average molecular weight $M_w$ of less than 20,000 g/mol, more preferably less than 10,000 g/mol, more preferably less than 5,000 g/mol, more preferably less than 4,000 g/mol, more preferably less than 2,000 g/mol, more preferably less than 500 g/mol, more preferably less than 100 g/mol; and/or a pour point of less than 0° C., more preferably −5° C. or less, more preferably −10° C. or less, more preferably −20° C. or less, still more preferably less than −40° C.; and/or a dielectric constant at 20° C. of less than 3.0, preferably less than 2.8, more preferably less than 2.5, more preferably less than 2.3, still more preferably less than 2.1; and/or a specific gravity (ASTM D 4052, 15.6/15.6° C.) of less than 0.920, more preferably less than 0.910, more preferably 0.650 to 0.900, more preferably 0.700 to 0.860, more preferably 0.750 to 0.855, more preferably 0.790 to 0.850, more preferably 0.800 to 0.840; and/or a boiling point of 100° C. to 500° C., more preferably 200° C. to 450° C., still more preferably 250° C. to 400° C.

In a preferred embodiment, the extender oil is a PAO comprising $C_6$ to $C_{14}$ olefins having a kinematic viscosity of 10 cSt or more at 100° C., and a viscosity index of 120 or more, preferably 130 or more, as determined by ASTM D-2270.

Desirable PAO's are commercially available under the tradename SHF® and SuperSyn® PAO's (ExxonMobil Chemical Company, Houston Tex.).

Other useful PAO's include those sold under the tradenames Synfluid™ available from ChevronPhillips Chemical Co. in Pasedena Tex., Durasyn™ available from BP Amoco Chemicals in London England, Nexbase™ available from Fortum Oil and Gas in Finland, Synton™ available from Crompton Corporation in Middlebury Conn., USA, and EMERY™ available from Cognis Corporation in Ohio, USA.

Polybutene

Polybutenes are useful as extender oil's herein. Suitable polybutenes, also referred to herein as polybutene processing oils, include homopolymers or copolymers of olefin derived units having from 3 to 8 carbon atoms, preferably from 4 to 6 carbon atoms. In a preferred embodiment, the polybutene is a homopolymer or copolymer of a $C_4$ raffinate. Examples of suitable polybutene polymers are described in, for example, SYNTHETIC LUBRICANTS AND HIGH-PERFORMANCE FUNCTIONAL FLUIDS 357-392 (Leslie R. Rudnick & Ronald L. Shubkin, ed., Marcel Dekker 1999).

Suitable polybutenes may include a copolymer comprising isobutylene derived units, 1-butene derived units, and/or 2-butene derived units. Preferred polybutenes include homopolymers, copolymers, and/or terpolymer of the three units or more. Preferred polybutenes include those in which isobutylene derived units comprise 40 to 100 wt %, preferably 40 to 99 wt %, more preferably 40 to 96 wt % of the polymer;

and/or the 1-butene derived units comprise 0 to 40 wt %, preferably 2 to 40 wt % of the copolymer; and/or the 2-butene derived units comprise 0 to 40 wt %, more preferably 0 to 30 wt %, still more preferably 2 to 20 wt % of the polymer.

In yet another embodiment, the polybutene is a homopolymer or copolymer of isobutylene and 1-butene, wherein the isobutylene derived units are from 65 to 100 wt % of the homopolymer or copolymer, and the 1-butene derived units are from 0 to 35 wt % of the copolymer.

Preferred polybutenes may have a $M_n$ of less than 15,000, and a $M_w$ of 60,000 or less. Particularly preferred polybutene processing oils include those having a number average molecular weight ($M_n$) of less than 10,000 g/mol, more preferably less than 8000 g/mol, still more preferably less than 6000 g/mol; and/or a number average molecular weight $M_n$ of greater than 400 g/mol, preferably greater than 700 g/mol, more preferably greater than 900 g/mol. A preferred embodiment can be a combination of any lower molecular weight limit with any upper molecular weight limit described herein. For example, in one embodiment of the polybutene of the invention, the polybutene has a number average molecular weight of from 400 g/mol to 10,000 g/mol, and from 700 g/mol to 8000 g/mol in another embodiment, and from 900 g/mol to 3000 g/mol in yet another embodiment.

Suitable polybutenes may also have a viscosity of greater than 35 cSt at 100° C., preferably greater than 100 cSt at 100° C., more preferably 10 to 6000 cSt at 100° C., still more preferably 35 to 5000 cSt at 100° C.

Commercial examples of useful polybutenes include the Parapol™ Series of processing oils (Infineum, Linden, N.J.). The commercially available Parapol series of polybutene processing oils are synthetic liquid polybutenes, each individual formulation having a certain molecular weight, all formulations of which can be used as an extender oil herein. The molecular weights of the Parapol oils are from 420 $M_n$ (Parapol 450) to 2700 $M_n$ (Parapol 2500) as determined by gel permeation chromatography. The MWD of the Parapol oils range from 1.8 to 3 in one embodiment, and from 2 to 2.8 in another embodiment; the pour points of these polybutenes are less than 25° C. in one embodiment, less than 0° C. in another embodiment, and less than −10° C. in yet another embodiment, and between −80° C. and 25° C. in yet another embodiment; and densities (IP 190/86 at 20° C.) range from 0.79 to 0.92 g/cm$^3$, and from 0.81 to 0.90 g/cm$^3$ in another embodiment.

Mineral Oils

Suitable extender oil's may also include mineral oils, which are distinguished by their viscosity indices determined according to ASTM D-2270, and by the amount of saturates and sulfur they contain. Hydrocarbon basestocks have been classified as Group I, II or III by the American Petroleum Institute (API). Group I basestocks are solvent refined mineral oils. They contain the most unsaturates and sulfur of the three groups, and have the lowest viscosity indices. Group II and Group III basestocks are referred to as High Viscosity Index and Very High Viscosity Index basestocks, respectively. They are hydroprocessed mineral oils. The Group III oils contain less unsaturates and sulfur than the Group I oils, and have higher viscosity indices compared to Group II oils.

In an embodiment, extender oil's may comprise:

Group I basestocks, including mineral oils that may have been refined using solvent extraction of aromatics, solvent dewaxing, and/or hydrofining to reduce sulfur content. Group I basestocks may have sulfur levels greater than 0.03 wt %, saturates levels of 60 to 80%, and a viscosity index of about 90 by ASTM D-2270; and/or Group II basestocks, including mineral oils that have been mildly hydrocracked with conventional solvent extraction of aromatics, solvent dewaxing, and more severe hydrofining to reduce sulfur levels to less than or equal to 0.03 wt %, as well as removing double bonds from some of the olefinic and aromatic compounds such that saturate levels are greater than 95-98%, and the viscosity index (VI) is about 80-120 by ASTM D-2270; and/or Group III basestocks, including mineral oils that have been hydrotreated to comprise saturate levels greater than 95%, to virtually 100%, sulfur contents of less than or equal to 0.03 wt % (preferably between 0.001 and 0.01%), and VI is in excess of 120 by ASTM D-2270.

In another embodiment the extender oil comprises a Group III hydrocarbon basestock. Preferably the extender oil comprises a mineral oil having a saturates levels of 90% or more, preferably 92% or more, preferably 94% or more, preferably 96% or more, preferably 98% or more, preferably 99% or more, and sulfur contents less than 0.03%, preferably between 0.001 and 0.01% and a viscosity index of 120 or more, preferably 130 or more.

Multimodal Polymer Composition Properties

It has been unexpectedly discovered that when the instant bimodal polymer compositions comprise an extender oil due to their higher molecular weight, a balance between improved elasticity, processability, and physical properties, may be obtained at a blend molecular weight that can be prepared with from about 10 phr, to about 50 phr extender oil in one embodiment, from about 20 to about 48 phr in another embodiment, and from about 25 to about 45 phr in yet another embodiment, wherein a desirable range may comprise any combination of any upper limit with any lower limit described herein.

In an embodiment, the multimodal polymer composition comprises an inherent viscosity (IV) measured in decalin at 135° C. according to ASTM D 1601, of from 2 to about 8 dl/g, and from about 3 to about 7 dl/g in another embodiment, and from 4 to about 6.5 dl/g in yet another embodiment, wherein a desirable range may comprise any combination of any upper limit with any lower limit described herein.

In an embodiment, the multimodal polymer composition comprises a Mooney viscosity of from 10 to 90 ML(1+4 @125° C.), and from 20 to 70 ML(1+4 @125° C.) in another embodiment, and from 40 to 60 ML(1+4 @125° C.) in yet another embodiment, wherein a desirable range may comprise any combination of any upper limit with any lower limit described herein.

The multimodal polymer composition possesses a $M_n$ between about 60,000 and 350,000 g/mol in one embodiment, and from 80,000 to 300,000 in another embodiment, and from 70,000 to 250,000 in yet another embodiment, wherein a desirable range may comprise any combination of any upper limit with any lower limit described herein.

The multimodal polymer composition possesses a MWD between about 2 and 10 in one embodiment, and from 3 to 8 in another embodiment, and from 3.5 to 7 in yet another embodiment, wherein a desirable range may comprise any combination of any upper limit with any lower limit described herein.

The multimodal polymer composition possesses a BI between about 0.3 and 1 in one embodiment, and from 0.4 to 0.95 in another embodiment, and from 0.5 to 0.9 in yet another embodiment, wherein a desirable range may comprise any combination of any upper limit with any lower limit described herein.

The multimodal polymer composition possesses about 35 to about 90 mol % ethylene, based on the total number of moles of the multimodal polymer composition, in one embodiment, and from 45 to 80 mol % in another embodiment, and from 55 to 75 mol % in yet another embodiment, wherein a desirable range may comprise any combination of any upper limit with any lower limit described herein.

The multimodal polymer composition possesses about 10 to about 65 mol % alpha-olefin, based on the total number of moles of the multimodal polymer composition, in one embodiment, and from 15 to 60 mol % in another embodiment, and from 25 to 45 mol % in yet another embodiment, wherein a desirable range may comprise any combination of any upper limit with any lower limit described herein.

In an embodiment, the alpha-olefin is preferably propylene. The multimodal polymer composition possesses about 15 to about 70 mol % propylene, based on the total number of moles of the multimodal polymer composition, in one embodiment, and from 20 to 60 mol % in another embodiment, and from 30 to 45 mol % in yet another embodiment, wherein a desirable range may comprise any combination of any upper limit with any lower limit described herein.

The multimodal polymer composition possesses about 0.1 to about 10 wt % (about 0.03 to about 3 mol %) diene, based on the total weight percent (mole percent) of the multimodal polymer composition, in one embodiment, and from 2.5 to 8 wt % in another embodiment, and from 3 to 7 wt % in yet another embodiment, wherein a desirable range may comprise any combination of any upper limit with any lower limit described herein.

In a preferred embodiment, the multimodal polymer composition comprises 45 to 75 wt % of the first polymer fraction and 25 to 55 wt % of the second polymer fraction, and 30 to 50 phr oil, wherein the multimodal polymer composition has a number average molecular weight of greater than or equal to about 60,000, and less than or equal to less than or equal to about 350,000 g/mol, and a Mooney viscosity of less than or equal to less than or equal to 90 ML(1+4@125° C.), wherein the cured multimodal polymer composition has a Shore A hardness of greater than or equal to 50, less than or equal to 60, and a minimum fatigue to failure value, determined as cycles to failure at 140% stretch, of greater than or equal to about 10,000, preferably greater than or equal to about 20,000, with greater than or equal to about 30,000 being most preferred.

Formation of the Multimodal Polymer Composition

The multimodal polymer composition may be produced by a process comprising serial reactors, parallel reactors, or a combination thereof.

In an embodiment, the multimodal polymer composition may be produced by a process comprising the steps of:

passing a first set of monomers comprising ethylene, a $C_3$-$C_{10}$ alpha-olefin, and non-conjugated diene, and a first Ziegler-Natta catalyst system into a first reactor of a series of two or more reactors;

polymerizing the first set of monomers to produce a first reactor effluent comprising a first polymer fraction having a Mooney viscosity of greater than or equal to 150 ML(1+4@125° C.);

passing the first reactor effluent into a subsequent reactor of the series of two or more reactors;

passing a second set of monomers comprising ethylene, a $C_3$-$C_{10}$ alpha-olefin, and non-conjugated diene, and a second Ziegler-Natta catalyst system into the subsequent reactor;

polymerizing the second set of monomers in the presence of the first polymer fraction to produce a second reactor effluent comprising at least a portion of the first polymer fraction and a second polymer fraction having a Mooney viscosity of from about 20 ML(1+4@125° C.) to about 120 ML(1+4@125° C.); and combining from about 10 phr to about 50 phr extender oil into the second reactor effluent to produce the multimodal polymer composition. In a preferred embodiment, the multimodal polymer composition comprises:

45 to 55 wt % of the first polymer fraction and 45 to 55 wt % of the second polymer fraction, wherein the multimodal polymer composition has a number average molecular weight of greater than or equal to about 60,000, and less than or equal to about 350,000 g/mol, and a Mooney viscosity of less than or equal to 90 ML(1+4@125° C.).

The catalyst system utilized in the first reactor may be the same or different from the catalyst system utilized in the subsequent reactor. Preferably, the catalyst systems in both the first reactor and the subsequent reactor are substantially the same.

Catalyst systems useful in the instant processes for producing the multimodal polymer composition may comprise a transition metal catalyst of the type known in the art as Ziegler, (also referred to as Ziegler-Natta) catalysts, which include a compound of a transition metal, i.e., a metal of Groups 3, 4, 5, 6, 7, 8, 9, 10, and/or 11 of the Periodic Table, and an organometal compound comprising a metal of Groups 1, 2, 12, and/or 13 of the Periodic Table.

The preferred catalyst system for use herein comprises a hydrocarbon soluble vanadium compound, in which the vanadium valence is 3 to 5, and an organo-aluminum compound, with the proviso that the catalyst system preferably yields one active catalyst species as described above. At least one of the vanadium compound/organo-aluminum pair selected for use herein must also contain a valence-bonded halogen.

Vanadium (V) compounds useful in practicing the instant processes include those having the formula (4):

(4)

wherein X=0 to 3 and each R is independently a $C_1$-$C_{30}$ alkyl or substituted alkyl radical; $VCl_4$; $VO(AcAc)_2$, where AcAc=acetyl acetonate; $V(AcAc)_3$; where AcAc=acetyl acetonate; $VOCl_x (AcAc)_{3-x}$, where AcAc=acetyl acetonate and where x=1 or 2; and $VCl_3$ nLB, and mixtures thereof, where n=2 or 3 and LB=a Lewis base capable of making hydrocarbon-soluble complexes with $VCl_3$. Examples of LB include tetrahydrofuran, 2-methyl-tetrahydrofuran, dimethyl pyridine, and the like.

In the formulas above, R preferably represents a $C_1$ to $C_{10}$ aliphatic, alicyclic or aromatic hydrocarbon radical such as ethyl, phenyl, isopropyl, butyl, propyl, n-butyl, i-butyl, hexyl, cyclohexyl, octyl, napthyl, and the like. Non-limiting, illustrative examples of formula (4) compounds include vanadyl trihalides, alkoxy halides and alkoxides such as $VOCl_3$ $VOCl_2$ (OBu) where Bu=butyl, and $VO(OC_2H_5)_3$. The most preferred vanadium compounds are $VCl_4$, $VOCl_3$, and $VOC_2$ (OR), wherein R preferably represents a $C_1$ to $C_{10}$ aliphatic, alicyclic or aromatic hydrocarbon radical.

The organo-aluminum compound (also referred to as a co-catalyst) is preferably represented by the formula: $AlR_3$, $Al(OR')R_2$, $AlR_2Cl$, $R_2Al$—O—$AlR_2$, $AlR'RCl$, $AlR_2I$, $Al_2R_3Cl_3$, $AlRCl_2$, and mixtures thereof, wherein R and R' each independently represent $C_1$ to $C_{30}$ aliphatic, alicyclic or aromatic hydrocarbon radicals as described above with respect to the vanadium compound formulas. A preferred organo-aluminum compound is $Al_2R_3Cl_3$, wherein R is defined as above. The most preferred organo-aluminum co-catalyst is ethyl aluminum sesquichloride (EASC, also abbreviated herein as "sesqui"), and represented by the formula $Al_2Et_3Cl_3$.

In a preferred embodiment, the catalyst comprises $VOCl_3$ and $Al_2R_3Cl_3$, preferably where R is ethyl, having a mole ratio of aluminum/vanadium (Al:V mole ratio) of greater than or equal to 2, with a preferred minimum Al:V mole ratio of about 4, and a maximum Al:V mole ratio of about 25, a preferred maximum of about 17, and a most preferred maximum Al:V mole ratio of about 15.

The catalyst components are preferably not premixed and aged prior to introduction into the reactors.

In the instant process, chain transfer agents such as hydrogen or diethyl zinc may be added to the first reactor, the second or subsequent reactor(s), or a combination thereof, of the process. Other chain transfer agents include $NH_3$ and/or other amines and/or silanes comprising $C_1$-$C_{10}$ alkyl groups, which may be added to the reaction to reduce the acidity of the polymerization system and thus control long chain branching.

In an embodiment, the first Ziegler-Natta catalyst system and the second Ziegler-Natta catalyst system each comprise vanadium. The chain transfer agent hydrogen ($H_2$) is fed into the first reactor and into the second reactor according to the equation (5):

$$\frac{(H_2/V)_{R1}}{(H_2/V)_{Overall}} > 1.43 \times \left[\frac{(\text{Catalyst Efficiency})_{R1}}{(\text{Catalyst Efficiency})_{Overall}}\right]^{-1.67} \quad (5)$$

$(H_2/V)_{R1}$ is the molar ratio of the moles of hydrogen fed into the first reactor to the moles of catalyst fed to the first reactor;

$(H_2/V)_{Overall}$ is the molar ratio of the moles of hydrogen fed into both the first reactor and into the second reactor to the moles of catalyst fed to both the first and second reactors;

(Catalyst Efficiency)$_{R1}$ is the catalyst efficiency of the first catalyst system in the first reactor, calculated by dividing the production rate in the first reactor by the mass amount of catalyst fed to the first reactor; and (Catalyst Efficiency)$_{OVERALL}$ is the catalyst efficiency of the first and second reactors combined, calculated by dividing the combined production rate from both reactors by the total catalyst feed (mass rate) to both reactors.

The actual ($H_2/V$) ratio when measured in the process preferably exceeds the value calculated by equation (5). Preferably, the ratio of Equation (5) value to the Actual Ratio of (Equation 5/($H_2/V$) Ratio Actual) is less than or equal to about 1.0, preferably less than or equal to about 0.9, preferably less than or equal to about 0.8, with preferably less than or equal to about 0.7 being more preferred. This ratio is preferably greater than or equal to 0.1, more preferably greater than or equal to 0.2 and more preferably greater than or equal to 0.3.

Any known solvent for the reaction mixture may be used in conducting the polymerization steps. Suitable solvents include $C_4$-$C_{20}$ hydrocarbon solvents such as aliphatic, cycloaliphatic and aromatic hydrocarbon solvents, or halogenated versions of such solvents. Preferred solvents include $C_4$-$C_{12}$ straight chain or branched chain, saturated hydrocarbons, $C_5$ to $C_9$ saturated alicyclic hydrocarbons, $C_5$ to $C_{20}$ aromatic hydrocarbons, $C_2$ to $C_{12}$ halogenated hydrocarbons, or combinations thereof. Non-limiting illustrative examples of preferred solvents include butane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, di-chloroethane, and/or trichloroethane.

Extender oil, and optionally other additives may be added to the first reactor product, to the second reactor product, or to both the first reactor product and the second reactor product. Preferably, the extender oil is added in total to the second reactor product.

In a preferred embodiment, the first high molecular weight fraction is produced in the first reactor, and the second low molecular weight fraction is produced in the second reactor. Conditions between the first and the second reactor (or subsequent reactor) may be differentiated as determined by the target molecular weight, and other desired properties of the various fractions.

After polymerization, and any catalyst deactivation or killing, the solvent, if present, can be removed by one or more flashing steps, solvent devolatilization steps, steam stripping, and/or by utilizing a liquid phase separation. Preferably, the solvent content in the final composition is less than or equal to about 0.1 wt %. At least a portion of the removed solvent can be recycled back into the process, and the multimodal polymer composition may then be further processed including being compounded with additives, being cured, being baled, pelletized, derivatized, or otherwise processed.

In a preferred embodiment, a hydrocarbon solvent is utilized in both the first reactor and in the second reactor, and the extender oil is added to the second reactor product. The solvent is then removed from the second reactor product by distillation, typically through steam stripping which includes the application of steam to the second reactor product. The solvent is then recovered, purified, and reused in the process (e.g., in the first reactor, the second reactor, or both.) The large difference between the boiling points of the oil and the solvent (e.g., hexane) allow for efficient removal of the solvent from the multimodal polymer composition in the instant process.

In an embodiment, the multimodal polymer composition may be produced by a process comprising the steps of:

(a) adding a first set of monomers comprising ethylene, a $C_3$-$C_{10}$ alpha-olefin, and non-conjugated diene, a $C_4$-$C_{20}$ hydrocarbon solvent, and a first Ziegler-Natta catalyst system into a first reactor of a series of two or more reactors;

(b) polymerizing the first set of monomers to produce a first reactor effluent comprising a first polymer fraction having a Mooney viscosity of greater than or equal to 150 ML(1+4@125° C.);

(c) directing or passing the first reactor effluent into a second reactor of the series of two or more reactors;

(d) adding a second set of monomers comprising ethylene, a $C_3$-$C_{10}$ alpha-olefin, and non-conjugated diene, a second Ziegler-Natta catalyst system, and optionally a $C_4$-$C_{20}$ hydrocarbon solvent into the second reactor;

(e) polymerizing the second set of monomers in the presence of the first polymer fraction to produce a second reactor effluent comprising at least a portion of the first polymer fraction and a second polymer fraction having a Mooney viscosity of greater than or equal to 20 ML(1+4@125° C.), and less than or equal to 120 ML(1+4@125° C.);

(f) adding about 10 phr to about 50 phr extender oil into the second reactor effluent; and (g) steam stripping the second reactor effluent to remove at least a portion of the solvent to produce the multimodal polymer composition.

The instant process may further include the steps of collecting and purifying at least a portion of the removed solvent to produce a recovered solvent, and/or recycle of the recovered solvent back into the process. Preferably, the recovered solvent is recycled back into the process at the addition step a), at the addition step d), or both.

In a preferred embodiment, the multimodal polymer composition comprises 45 to 75 wt % of the first polymer fraction and 25 to 55 wt % of the second polymer fraction, and 10 to 50 phr oil, wherein the multimodal polymer composition has a number average molecular weight of about 60,000 to about 350,000 g/mol, and a Mooney viscosity of less than or equal to about 90 ML(1+4@125° C.), wherein the cured multimodal polymer composition has a Shore A hardness of about 50 to about 60.

The first reactor is preferably operated within a temperature range of −40° C. to about 80° C. Within this range, a temperature of at least 0° C. is preferred, with at least 15° C. being more preferred and at least 20° C. being more preferred. The temperature is also preferably less than 65° C., with less than 45° C. being more preferred.

The residence time in the first reactor is preferably in the range of 3 minutes to about 30 minutes. Within this range, a residence time of at least 4 minutes is preferred, with at least 5 minutes being more preferred and at least 6 minutes being more preferred. The residence time is also preferably less than 20 minutes with less than 15 minutes being more preferred.

The second reactor or reactors is/are preferably operated within a temperature range of −40° C. to about 80° C. Within this range, a temperature of at least 0° C. is preferred, with at least 20° C. being more preferred and at least 40° C. being more preferred. The temperature is also preferably less than 65° C., with less than 50° C. being more preferred.

The residence time in the second reactor or reactors is/are preferably in the range of 2 minutes to about 30 minutes. Within this range, a residence time of at least 3 minutes is preferred, with at least 4 minutes being more preferred and at least 5 minutes being more preferred. The residence time is also preferably less than 15 minutes, with less than 10 minutes being more preferred.

Embodiments of the multimodal polymer composition produced according to the instant process include economically produced synthetic materials that when incorporated into a thermoplastic vulcanizate, can have one or more of the following advantages over previously known materials: improved balance of processability, resilience, durability, and reduced quantities of extender oil in the polymer as produced in the polymer manufacturing plant, thereby increasing overall plant capacity and improving cost.

Additional Elastomeric Compounds

The discontinuous rubber phase of the instant thermoplastic vulcanizate composition may further include one or more rubbers or other elastomeric compounds. Some non-limiting examples of these rubbers include olefinic elastomeric copolymers, natural rubber, styrene-butadiene copolymer rubber, butadiene rubber, butyl rubber, acrylonitrile rubber, butadiene-styrene-vinyl pyridine rubber, urethane rubber, and polyisoprene rubber.

Olefinic elastomeric copolymers suitable for use in combination with the instant multimodal polymer composition include those commercially available under the tradenames Vistalon™ (ExxonMobil Chemical Co.; Houston, Tex.), Vistamaxx™ (ExxonMobil Chemical Co.), Keltan™ (DSM Copolymers; Baton Rouge, La.), Nordel™ IP (Dow Chemical Co.), Nordel MG™ (Dow Chemical Co.), Buna™ (Lanxess), Royalene™ (Chemtura), Exact™ (ExxonMobil Chemical Co) and Engage™ (Dow Chemical Co).

Continuous Phase

Any thermoplastic resin suitable for use in the manufacture of thermoplastic vulcanizates can be used to manufacture the thermoplastic vulcanizates of the instant thermoplastic vulcanizate composition. Useful thermoplastic resins include solid, generally high molecular weight plastic resins. Preferred resins include non-crystalline (amorphous), crystalline and semi-crystalline polymers. Preferred resins include those having a crystallinity of at least 25% as measured by differential scanning calorimetry. Selection of particular resins preferably includes those that have a melt temperature lower than the decomposition temperature of the rubber.

Useful thermoplastic resins preferably have a weight average molecular weight from about 200,000 to about 600,000, and a number average molecular weight from about 80,000 to about 200,000. More preferably, these resins have a weight average molecular weight from about 300,000 to about 500,000, and a number average molecular weight from about 90,000 to about 150,000.

Useful thermoplastic resins preferably have a melt temperature (Tm) that is preferably from about 150 to about 175° C., preferably from about 155 to about 170° C., and more preferably from about 160 to about 170° C. The glass transition temperature (Tg) of these resins is preferably less than about 10° C., preferably less than about 5° C., more preferably less than about 3° C., and most preferably in the range from −5° C. to about 5° C. The crystallization temperature (Tc) of these resins is preferably greater than 95° C., more preferably greater than 100° C., and even more preferably greater than 110° C., with the preferred range being from 105 to about 110° C. as measured by DSC at 10° C./min. Preferably, the linear thermoplastic resins have a melt flow rate that is less than about 10 dg/min, preferably less than about 2 dg/min, still more preferably less than about 1.0 dg/min, and even more preferably less than about 0.5 dg/min.

Exemplary thermoplastic resins include crystalline and crystallizable polyolefins, polyimides, polyesters (nylons), and fluorine-containing thermoplastics. Also, the thermoplastic resins may include copolymers of polyolefins with styrene such as styrene-ethylene copolymer. The preferred thermoplastic resins are crystallizable polyolefins that are formed by polymerizing alpha-olefins such as ethylene, propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene or ethylene or propylene with another alpha-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. Specifically included are the reactor, impact, and random copolymers of propylene with ethylene or the higher alpha-olefins, or with $C_{10}$-$C_{20}$ diolefins. Comonomer contents for these propylene copolymers will typically be from 1 to about 30% by weight of the polymer. Blends or mixtures of two or more polyolefin thermoplastics such as described herein, or with other polymeric modifiers, are also suitable in accordance with this invention. These homopolymers and copolymers may be synthesized by using any polymerization technique known in the art such as, but not limited to, the Phillips-catalyzed reactions, conventional Ziegler-Natta type polymerizations, and catalysis employing single-site organometallic catalysts including, but not limited to, metallocene catalysts.

An especially preferred linear thermoplastic resin is a high-crystallinity isotactic or syndiotactic polypropylene. This polypropylene generally has a density of from about 0.85 to about 0.91 g/cc, with the largely isotactic polypropylene having a density of from about 0.90 to about 0.91 g/cc. Also, high and ultra-high molecular weight polypropylene that has a fractional melt flow rate is highly preferred. These polypropylene resins are characterized by a melt flow rate that is less than or equal to 10 dg/min, more preferably less than or equal to 1.0 dg/min, and even more preferably less than or equal to 0.5 dg/min per ASTM D-1238.

Thermoplastics which can be added for property modification include additional non-crosslinkable elastomers, including non-TPV thermoplastics and thermoplastic elastomers. Examples include polyolefins such as polyethylene homopolymers and copolymers with one or more $C_3$-$C_8$ alpha-olefins. Specific examples include ethylene-propylene rubber (EPR), ULDPE, VLDPE, LLDPE, HDPE, and those polyethylenes commonly known as "plastomers" which are metallocene catalyzed copolymers of ethylene and $C_4$-$C_8$ having a density of about 0.870 to 0.920 g/cc. Propylene based elastomeric copolymers of propylene and 8-20 wt % of ethylene, and having a crystalline melt point (60-120° C.) are particularly useful with a polypropylene based thermoplastic phase, for example the random propylene copolymers sold under the name Vistamaxx by Exxon Mobil Chemical Co. Other suitable thermoplastic elastomers include hydrogenated styrene, butadiene and/or isoprene, styrene triblock copolymers ("SBC"), including SEBS, SEPS, SEEPS, and the like. Other suitable thermoplastics include non-hydrogenated SBC triblock polymers having a rubbery mid-block with thermoplastic end-blocks including, styrene-isoprene-styrene, styrene-butadiene-styrene, and styrene-(butadiene-styrene)-styrene polymers.

The thermoplastic is present in the dynamically vulcanized composition from about 20 to about 300 parts by weight of a thermoplastic resin per 100 parts by weight dynamically-cured rubber, and from about 25 to about 100 parts in another embodiment, and from 30 to 80 parts in yet another embodiment, wherein a desirable range may comprise any combination of any upper limit with any lower limit.

Curative System

Examples of curing agents suitable for use herein include sulfur, peroxide based curing agents, resin curing agents, silanes and hydrosilane curing agents, and the like, as described in "Vulcanization", Chapter 7 of SCIENCE AND TECHNOLOGY OF RUBBER, by A. Y. Coran, (F. R. Eirich ed., Academic Press Inc., 1978).

Peroxide curatives are generally selected from organic peroxides. Examples of organic peroxides include, but are not limited to, di-tert-butyl peroxide, dicumyl peroxide, t-butyl-cumyl peroxide, alpha,alpha-bis(tert-butylperoxy) diisopropyl benzene, 2,5-dimethyl-2,5-di(t-butylperoxy)hexane (DBPH), 1,1-di(tert-butylperoxy)-3,3,5-trimethyl cyclohexane, n-butyl-4-4-bis(tert-butylperoxy) valerate, benzoyl peroxide, lauroyl peroxide, dilauroyl peroxide, 2,5-dimethyl-2,5-di(tert-butylperoxy) hexyne-3, diaryl peroxides, ketone peroxides, peroxydicarbonates, peroxyesters, dialkyl peroxides, hydroperoxides, peroxyketals, and mixtures thereof.

The peroxide curatives are preferably employed in conjunction with a coagent. Examples of coagents include trial-lylcyanurate, triallyl isocyanurate, triallyl phosphate, sulfur, N-phenyl-bis-maleamide, zinc diacrylate, zinc dimethacrylate, divinyl benzene, 1,2-polybutadiene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, oximer for e.g., quinone dioxime, and the like.

Suitable resin curing systems include phenolic resins, or mixture thereof, which are capable of crosslinking a rubber polymers. Suitable phenolic resins include those disclosed in U.S. Pat. No. 2,972,600, U.S. Pat. No. 3,287,440, U.S. Pat. No. 5,952,425 and U.S. Pat. No. 6,437,030, which are incorporated herein by reference.

The preferred phenolic resin curatives can be referred to as resole resins, which are made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms are preferred. In one embodiment, a blend of octyl phenol and nonylphenol-formaldehyde resins are employed. The blend includes from about 25 to about 40% by weight octyl phenol and from about 75 to about 60% by weight nonylphenol, more preferably, the blend includes from about 30 to about 35 weight percent octyl phenol and from about 70 to about 65 weight percent nonylphenol. In one embodiment, the blend includes about 33% by weight octylphenol-formaldehyde and about 67% by weight non-ylphenol formaldehyde resin, where each of the octylphenol and nonylphenol include methylol groups. This blend can be solubilized in paraffinic oil at about 30% solids.

Exemplary phenolic resins that are useful in the practice of the instant thermoplastic vulcanizates may be obtained under the tradenames SP-1044, SP-1045 (Schenectady International; Schenectady, N.Y.), which are referred to as alkylphenol-formaldehyde resins. SP-1045 is believed to be an octylphenol-formaldehyde resin that contains methylol groups. The SP-1044 and SP-1045 resins are believed to be essentially free of halogen substituents or residual halogen compounds. By essentially free of halogen substituents, it is meant that the synthesis of the resin provides for a non-halogenated resin that may only contain trace amounts of halogen containing compounds.

An example of a preferred phenolic resin curative is defined according to the general formula (6):

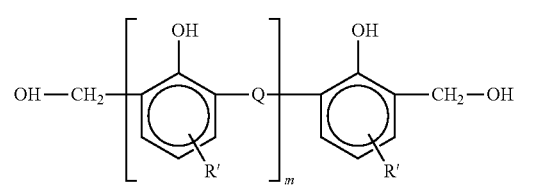

(6)

where Q is a divalent radical selected from the group consisting of —$CH_2$— and —$CH_2$—O—$CH_2$—; m is zero or a positive integer from 1 to 20 and R' is an alkyl group. Preferably, Q is the divalent radical —$CH_2$—O—$CH_2$—, m is zero or a positive integer from 1 to 10, and R' is an alkyl group having less than 20 carbon atoms. Still more preferably, m is zero or a positive integer from 1 to 5 and R' is an alkyl group having between 4 and 12 carbon atoms.

Additives

The instant thermoplastic vulcanizate composition may further comprise one or more additives. These additives may be present in addition to, or in place of the additives which may be present in the multimodal polymer composition. Suitable additives include, but are not limited to, plasticizers, extender oils, synthetic processing oils, fillers, processing aids, and/or the like.

As discussed above, extender oils may include, but are not limited to, aromatic, naphthenic, and paraffinic extender oils. Exemplary synthetic processing oils are polylinear alpha-olefins, polybranched alpha-olefins, and hydrogenated poly-alphaolefins. The compositions of this invention may include organic esters, alkyl ethers, or combinations thereof U.S. Pat. No. 5,290,886 and U.S. Pat. No. 5,397,832 are incorporated herein in this regard. The addition of certain synthetic processing oils are polylinear alpha-olefins, polybranched alpha-olefins, and hydrogenated polyalphaolefins and or low to medium molecular weight alkyl esters and alkyl ether esters to the instant compositions may dramatically lower the Tg of the polyolefin and rubber components, and of the overall composition, and may improve the low temperatures properties, particularly flexibility and strength. These alkyl esters and alkyl ether esters generally have a molecular weight that is generally less than about 10,000 g/mol. It is believed that the improved effects may be achieved by the partitioning of the ester into both the polyolefin and rubber components of the compositions. Particularly suitable esters include monomeric and oligomeric materials having an average molecular weight below about 2,000 g/mol, and preferably below about 600 g/mol. The ester or synthetic oil should be compatible, or miscible, with both the polyolefin and rubber components of the composition; i.e. that it mix with the other components to form a single phase.

The instant thermoplastic vulcanizate may likewise include a polymeric processing additive. The processing additive employed is a polymeric resin that has a very high melt flow index. These polymeric resins include both linear and branched molecules that have a melt flow rate that is greater than about 500 dg/min, more preferably greater than about 750 dg/min, even more preferably greater than about 1000 dg/min, still more preferably greater than about 1200 dg/min, and still more preferably greater than about 1500 dg/min. Melt flow rate is a measure of how easily a polymer flows under standard pressure, and is measured by using ASTM D-1238 at 230° C. and 2.16 kg load. The thermoplastic elastomers of the present invention may include mixtures of various branched or various linear polymeric processing additives, as well as mixtures of both linear and branched polymeric processing additives. Reference to polymeric processing additives will include both linear and branched additives unless otherwise specified. The preferred linear polymeric processing additives are polypropylene homopolymers. The preferred branched polymeric processing additives include diene-modified polypropylene polymers. Thermoplastic vulcanizates that include similar processing additives are disclosed in U.S. Pat. No. 6,451,915, which is incorporated herein by reference.

In addition, the composition may also include reinforcing and non-reinforcing fillers, antioxidants, stabilizers, rubber processing oil, lubricants, antiblocking agents, anti-static agents, waxes, foaming agents, pigments, flame retardants and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black, as well as organic and inorganic nanoscopic fillers. Fillers, such as carbon black, are preferably added in combination with a carrier such as polypropylene.

In certain embodiments, the thermoplastic vulcanizates may include acid scavengers. These acid scavengers are preferably added to the thermoplastic vulcanizates after the desired level of cure has been achieved. Preferably, the acid scavengers are added after dynamic vulcanization. Useful acid scavengers include hydrotalcites. Both synthetic and natural hydrotalcites can be used. An exemplary natural hydrotalcite can be represented by the formula $Mg_6Al_2(OH)_{1-6}CO_3.4H_2O$, Synthetic hydrotalcite compounds, which are believed to have the formula: $Mg_{4.3}Al_2(OH)_{12.6}CO_3.mH_2O$ or $Mg_{4.5}Al_2(OH)_{13}CO_{3.3}.5H_2O$, can be obtained under the tradenames DHT-4A™ or Kyowaad™ 1000 (Kyowa; Japan). Another commercial example is that available under the trade name Alcamizer™ (Kyowa).

Thermoplastic Vulcanizate Composition

Unexpectedly, it has been discovered that through the application of the instant process for making EPDM polymers, which may be referred to herein as "reverse" bimodal, an improved TPV may be produced.

Preferably, the EPDM is produced using the instant reverse bimodal process with a high molecular weight fraction (polysplit) that is greater than 40%. The basis of this novel synthesis approach is to make a "high" molecular weight polymer fraction in one reactor, and a "low" molecular weight fraction in a second reactor. Furthermore, unlike the conventional bimodal processes (e.g., Vistalon®7500 synthesis), the level of high molecular weight fractions in the reverse bimodal synthesis can be increased from the 10-15% (polysplit) level to much higher levels through utilization of a dual catalyst injection system. Branching is controlled through the use of ammonia as a Lewis base. Although this reactor concept has been previously described, for example in U.S. Pat. No. 6,686,419, the polymers of the prior art which are utilized herein as Comparative Examples did not give optimum properties sought for in TPV formulations. It has been discovered that the instant TPV formulations may be achieved when the $M_n$ (number average molecular weight) of the low molecular weight fraction is high enough to cure this fraction efficiently, otherwise poor properties result. The bimodal EPDMs of the instant disclosure results in TPVs with an overall property balance that is comparable to unimodal high molecular weight rubbers (e.g., Vistalon® 3666, and the like) and with much superior elasticity properties as demonstrated by significantly lower tension and compression set. This is the first time that such a unique overall balance of properties could be achieved in TPVs. Preferably, the instant thermoplastic vulcanizate compositions contain a sufficient amount of the multimodal polymer composition (rubber) to form rubbery compositions of matter. The skilled artisan will understand that rubbery compositions of matter are those that have ultimate elongations greater than 100 percent, and that quickly retract to 150 percent or less of their original length within about 10 minutes after being stretched to 200 percent of their original length and held at 200 percent of their original length for about 10 minutes.

The thermoplastic vulcanizate compositions of the instant disclosure generally include from about 20 to about 300 parts by weight, preferably from about 30 to about 250 parts by weight, and more preferably from about 40 to about 200 parts by weight thermoplastic resin per 100 parts by weight rubber. The thermoplastic vulcanizate compositions of the instant disclosure also generally include from about 20 to about 250 parts by weight, preferably from about 30 to about 150 parts by weight, and more preferably from about 40 to about 100 parts by weight additional oil per 100 parts by weight rubber.

When employed, the polymeric processing additives may be employed in an amount from about 0.5 to about 20 parts by weight, preferably from about 1 to about 10 parts by weight, and more preferably from about 2 to about 6 parts by weight of a polymeric processing additive per 100 parts by weight rubber.

Fillers, such as carbon black or clay, may be added in amount from about 10 to about 250, per 100 parts by weight of rubber. The amount of carbon black that can be used depends, at least in part, upon the type of carbon black and the amount of extender oil that is used.

Those ordinarily skilled in the art will appreciate the appropriate quantities, types of cure systems, and vulcanization conditions required to carry out the vulcanization of the rubber. The rubber can be vulcanized by using varying amounts of curative, varying temperatures, and a varying time of cure in order to obtain the optimum crosslinking desired.

The curative is preferably employed in an amount equal to or in excess of 2, more preferably in excess of 3, even more preferably in excess of 3.5, still more preferably in excess of 4.0, even more preferably in excess of 4.5, and still more preferably in excess of 5 parts by weight per 100 parts by weight rubber; and the curative is preferably employed in an amount less than 10, preferably less than 9, more preferably less than 7.5, even more preferably less than 6.5, still more preferably less than 6.0, and even more preferably less than 5.5 parts by weight per 100 parts by weight rubber.

When utilized, stannous chloride is preferably employed in an amount equal to or in excess of 0.2, more preferably equal to or in excess of 0.25, even more preferably equal to or in excess of 0.3, still more preferably equal to or in excess of 0.4, and even more preferably equal to or in excess of 0.5 parts by weight per 100 parts by weight rubber; and the stannous chloride is preferably employed in an amount equal to or less than 2.0, preferably equal to or less than 1.5, preferably equal to or less than 0.9, preferably equal to or less than 0.85, more preferably equal to or less than 0.8, still more preferably equal to or less than 0.75, and even more preferably equal to or less than 0.7 parts by weight per 100 parts by weight rubber. Alternatively, the thermoplastic vulcanizates of this invention may include from 0.2 to 0.9, optionally from about 0.25 to about 0.85, and optionally from about 0.3 to about 0.8 parts by weight stannous chloride per 100 parts by weight rubber.

When utilized, zinc oxide is preferably employed in an amount equal to or in excess of 0.25, preferably equal to or in excess of 0.3, even more preferably equal to or in excess of 0.5, still more preferably in excess of 0.8, and even more preferably equal to or in excess of 1.0 parts by weight per 100 parts by weight rubber; and the zinc oxide is preferably employed in an amount equal to or less than 4.0, preferably equal to or less than 3.0, and more preferably equal to or less than 2.0, parts by weight per 100 parts by weight rubber. Alternatively, the thermoplastic vulcanizates of this invention may include from 0.25 to 4.0, optionally from about 0.3 to about 3.0, and optionally from about 0.5 to about 2.0 parts by weight zinc oxide per 100 parts by weight rubber.

When employed, acid scavengers, such as hydrotalcite, may be employed in an amount from about 0.1 to about 5% by weight, preferably from about 0.2 to about 3% by weight, and more preferably from about 0.5 to about 1.0% by weight based on the total weight of the thermoplastic vulcanizate.

When present, extender oil(s) may be employed in an amount from about 5 to about 300 parts by weight, preferably from about 30 to about 250 parts by weight, and more preferably from about 70 to about 200 parts by weight extender oil per 100 parts by weight rubber. The quantity of the extender oil depends upon the properties desired, with the upper limit depending upon the compatibility of the particular oil and the blended ingredients; this limit is exceeded when excessive exuding of extender oil occurs.

The instant thermoplastic vulcanizate composition possesses a Shore A hardness from 30 to 100 in one embodiment, and from 40 to 95 in another embodiment, and from 50 to 90 in yet another embodiment, wherein a desirable range may comprise any combination of any lower limit with any upper limit described herein. Shore hardness is determined according to ISO 868 with a 15 second interval and/or per ASTM D-2240 with a 5 second time interval.

The instant thermoplastic vulcanizate composition possesses a tensile strength, determined according to ASTM D-412, of from about 5 MPa to about 20 MPa in one embodiment, and from about 6 to 10 MPa in another embodiment, and from about 7 to 8 MPa in yet another embodiment, wherein a desirable range may comprise any combination of any lower limit with any upper limit described herein.

The instant thermoplastic vulcanizate composition possesses an elongation at break, determined according to ASTM D-412, of from about 100% to about 600% in one embodiment, and from about 250 to 450% in another embodiment, and from about 300% to 400% in yet another embodiment, wherein a desirable range may comprise any combination of any lower limit with any upper limit described herein.

The instant thermoplastic vulcanizate composition may have a tension set, determined according to ASTM D-412, of from about 5% to about 20% in one embodiment, and from about 8% to 13% in another embodiment, and from about 8.5% to about 11% in yet another embodiment, wherein a desirable range may comprise any combination of any lower limit with any upper limit described herein.

The instant thermoplastic vulcanizate composition may have a compression set determined according to ASTM D-395 Method B at 22 h@ 70° C., of from about 20% to about 50% in one embodiment, and from about 25% to 45% in another embodiment, and from about 30% to about 40% in yet another embodiment, wherein a desirable range may comprise any combination of any lower limit with any upper limit described herein.

The instant thermoplastic vulcanizate composition may have a weight gain determined according to ASTM D-471 at 24 h@ 121° C., of from about 60% to about 200% in one embodiment, and from about 70% to 90% in another embodiment, and from about 72% to about 80% in yet another embodiment, wherein a desirable range may comprise any combination of any lower limit with any upper limit described herein.

The instant thermoplastic vulcanizate composition may have a LCR viscosity at 204° C., 12001/s, of from about 60 Pa s to about 150 Pa s in one embodiment, and from about 70 Pa s to 95 Pa s in another embodiment, and from about 80 Pa s to 90 Pa s in yet another embodiment, wherein a desirable range may comprise any combination of any lower limit with any upper limit described herein.

Dynamic Vulcanization

The thermoplastic vulcanizates are preferably prepared by employing dynamic vulcanization techniques. Dynamic vulcanization refers to a vulcanization or curing process for a rubber contained in a blend that includes the rubber, curatives and at least one thermoplastic resin. The rubber is vulcanized under conditions of shear and extension at a temperature at or above the melting point of the thermoplastic resin. The rubber is thus simultaneously crosslinked and dispersed (preferably as fine particles) within the thermoplastic resin matrix, although other morphologies, such as co-continuous morphologies, may exist depending on the degree of cure, the rubber to plastic viscosity ratio, the intensity of mixing, the residence time, and the temperature. Additives are preferably present within the composition when the rubber is dynamically vulcanized.

In one embodiment, the dynamic vulcanization of the rubber is carried out by employing a curative and optionally, other additives within a continuous process that undergoes relatively high shear as defined in U.S. Pat. No. 4,594,390, which is incorporated herein by reference. In particularly preferred embodiments, the mixing intensity and residence time experienced by the ingredients during dynamic vulcanization is preferably greater than that proposed in U.S. Pat. No. 4,594,390. Dynamic vulcanization may occur within a variety of mixing equipment including batch mixers such as Brabender mixers and continuous mixers such as multiple-screw extruders. The various pieces of equipment that can be employed includes those described in "Mixing Practices Incorporating Twin-Screw Extruders," by Andersen, and "Intermeshing Twin-Screw Extruders" by Sakai, Chapters 20 and 21, Mixing and Compounding of Polymers: Theory and Practice by Ica Manas-Zloczower and Zebev Tadmor, (New York: Hanser, 1994), which is incorporated herein by reference.

In certain embodiments, certain ingredients are added after dynamic vulcanization or after phase inversion. As those skilled in the art appreciate, dynamic vulcanization may begin by including a greater volume fraction of rubber than thermoplastic resin. As such, the thermoplastic resin may be present as the discontinuous phase when the rubber volume fraction is greater than that of the volume fraction of the thermoplastic resin. As dynamic vulcanization proceeds, the viscosity of the rubber increases and phase inversion occurs under dynamic mixing. In other words, upon phase inversion, the thermoplastic resin phase becomes the continuous phase.

In one embodiment, the acid scavengers (e.g., hydrotalcite) are added after about 50%, preferably 75%, and more preferably about 90% of the curative is consumed. In preferred embodiments, the acid scavengers are added after the curative is completely consumed or after full cure, where applicable, has been achieved. In one embodiment, the acid scavenger can be added with a carrier. For example, the acid scavenger can be blended with an oil or with a thermoplastic resin such as polypropylene and the mixture added to the thermoplastic vulcanizate.

Other ingredients, such as additional thermoplastic resins, additional thermoplastic vulcanizates, processing additives, and/or pigments, may likewise be added after dynamic vulcanization or phase inversion.

The presence of additional ingredients after dynamic vulcanization can be accomplished by employing a variety of techniques. In one embodiment, the additional ingredients can be added while the thermoplastic vulcanizate remains in its molten state from the dynamic vulcanization process. For example, the additional ingredients can be added downstream of the location of dynamic vulcanization within a process that employs continuous processing equipment, such as a single or twin screw extruder. In other embodiments, the thermoplastic vulcanizate can be "worked-up" or pelletized, subsequently melted, and the additional ingredients can be added to the molten thermoplastic vulcanizate product. This latter process may be referred to as a "second pass" addition of the ingredients.

Despite the fact that the rubber may be partially or fully cured, the compositions of this invention can be processed and reprocessed by conventional plastic processing techniques such as extrusion, injection molding, and compression molding. The rubber within these thermoplastic elastomers is usually in the form of finely-divided and well-dispersed particles of vulcanized or cured rubber within a continuous thermoplastic phase or matrix, although a co-continuous morphology or a phase inversion is also possible.

In those embodiments where the cured rubber is in the form of finely-divided and well-dispersed particles within the thermoplastic medium, the rubber particles typically have an average diameter that is less than 50 micrometers, preferably less than 30 micrometers, even more preferably less than 10 micrometers, still more preferably less than 5 micrometers and even more preferably less than 1 micrometer. In preferred embodiments, at least 50%, more preferably at least 60%, and even more preferably at least 75% of the particles have an average diameter of less than 5 micrometers, more preferably less than 2 micrometers, and even more preferably less than 1 micrometer.

In one embodiment, the rubber is advantageously completely or fully cured. The degree of cure can be measured by determining the amount of rubber that is extractable from the thermoplastic vulcanizate by using boiling xylene as an extractant. This method is disclosed in U.S. Pat. No. 4,311,628. Preferably, the rubber has a degree of cure where not more than 15 weight percent, preferably not more than 10 weight percent, more preferably not more than 5 weight percent, and still more preferably not more than 3 weight percent is extractable by boiling xylene as described in U.S. Pat. Nos. 5,100,947 and 5,157,081, which are incorporated herein by reference. Alternatively, the rubber has a degree of cure such that the crosslink density is preferably at least $4 \times 10^{-5}$, more preferably at least $7 \times 10^{-5}$, and still more preferably at least $10 \times 10^{-5}$ moles per milliliter of rubber. See also "Crosslink Densities and Phase Morphologies in Dynamically Vulcanized TPEs," by Ellul et al., 68 Rubber Chemistry and Technology 573-584 (1995).

In the process of the instant disclosure, the process oil is preferably added in three or more locations, wherein at least the first and second additions of oil take place prior to or just after the onset of vulcanization. In one embodiment, a first amount less than about 30 phr of process oil is added to the granular material before, at, or immediately after the time of feeding to the twin screw. The temperature in the extruder becomes hot enough to melt the polymeric components from the energy created by the shearing forces in the extruder, though some external heating can be added as appropriate. The temperature tends to rise as the rubber is being vulcanized, and some external cooling may also be needed, until about the time that the continuous phase of rubber with dispersed thermoplastic inverts, the rubber becomes substantially vulcanized, and begins to form dispersed cross-linked rubber particles. Oil is then preferably added again before, at or within 10% total extruder length ("L") after the onset of vulcanization. More oil may be added as the rubber becomes substantially vulcanized, preferably in at least one L/d ("d" is extruder diameter) after the earlier oil injection(s), and preferably from about the completion of the rubber vulcanization to as far as the end of the extruder. In all injections into the extruder the oil may be pre-heated prior to injection.

In a process of the instant disclosure, the oil injection points into the extruder are positioned at or before one or more distributive mixing elements in the extruder, which distributive mixing element(s) is/are followed by one or more dispersive mixing elements. This arrangement particularly assists effective blending of the components for ease of processing and uniformity of the final extruded product. Additionally, it is particularly advantageous to add oil diluted curative, or molten curative, through an injection port positioned in the same manner. The distributive element serves principally to effect homogeneous blending of one component with another and the dispersive mixing element serves principally to effect reduction in particle size of the dispersed phase material. In another embodiment, the extruder may have multiple barrels, with different temperature ranges for the different barrels.

Unexpectedly, it was discovered that as the molecular weight of the low MW fraction was varied and increased to about 50 (ML 1+4@125° C.), the instant TPVs were obtained having an improved overall property balance, which is comparable to TPVs comprising conventional unimodal high molecular weight oil-extended rubbers. However, TPVs as disclosed herein possess superior elasticity properties as demonstrated by significantly lower tension and compression set. To our knowledge, this is the first time that such a unique overall balance of properties has been achieved in TPVs.

Thus, one embodiment of the present invention is directed to a thermoplastic vulcanizate composition possessing a compression set of less than 35 (22 h@70° C.), or 30 or 25 or 20, and a tension set of less than 15% or 14% or 13% or 12% or 10%, comprising a dynamically-cured rubber, and from about 25 to about 100 parts or 80 parts by weight of a thermoplastic resin per 100 parts by weight dynamically-cured rubber; wherein the dynamically-cured rubber comprises ethylene, a $C_3$-$C_{10}$ alpha-olefin, and a non-conjugated diene, and from about 10 phr to about 50 phr of an extender oil. The components may be described in alternate embodiments as described herein.

In order to demonstrate the practice of the present invention, the following examples have been prepared and tested. The examples should not, however, be viewed as limiting the scope of the invention.

The TPV of the instant disclosure is useful for making a variety of articles such as weather seals, hoses, belts, gaskets, moldings, boots, elastic fibers, and like articles. They are useful for making articles by blow molding, extrusion, injection molding, thermo-forming, elastic-welding, compression molding techniques, and by extrusion foaming. More specifically, they are useful for making vehicle parts such as weather seals, brake parts such as cups, coupling disks, and diaphragm cups, boots such as constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal/plastic combination materials. Also contemplated are transmission belts including V-belts, toothed belts with truncated ribs containing fabric faced V's, ground short fiber reinforced V's or molded gum with short fiber flocked V's. Foamed articles, such as weather seal extrudates for the construction and vehicle manufacture industries, and for liquid carrying hoses, e.g., underhood automotive, are also particularly well suited.

EXAMPLES

For purposes herein:

Shore A hardness is determined according to ISO 868 with a 15 second interval and/or per ASTM D-2240 with a 5 second time interval;

Tensile strength is determined according to ASTM D-412;

Elongation at break is determined according to ASTM D-412;

Stress at 100% strain is determined according to ASTM D-412;

Tension set is determined according to ASTM D-412;

Compression set is determined according to ASTM D-395 Method B;

Weight gain is determined according to ASTM D-471; and

LCR Viscosity is determined using a Dynisco® capillary rheometer at 1200 l/s and 202° C.

All testing of Brabender-batch samples was performed on compression molded "ISO" plaques; the thickness of the plaques was 1.5-2.0 mm. For samples prepared using a continuous twin screw process measurements were taken on ISO plaques prepared by die cutting injection molded plaques having a thickness of 2.0 mm.

The following examples were prepared from the components listed below.

TABLE 1

| Components | | |
|---|---|---|
| | Description | Available from |
| Vistalon ® 3666 (V3666) | Oil extended EPDM rubber Ethylene-propylene-ethylidene norbornene (oil = 75 phr), Mooney (ML 1 + 4, 125° C.) = 52, 64 wt. % ethylene, 4.5 wt % ENB, $M_w/M_n$ = 5 | ExxonMobil |
| Vistalon ® 7500 (V7500) | Ethylene-propylene-ethylidene norbornene (oil = 0 phr), Mooney (ML 1 + 4, 125° C.) = 90, 55 wt. % ethylene, 5.7 wt. % ENB, $M_w/M_n$ = 5 | ExxonMobil |
| VX4779 | Oil extended EPDM rubber Ethylene-propylene-ethylidene norbornene (oil = 90 phr), Mooney (ML 1 + 4, 125° C.) = 53, 66 wt. % ethylene, 4.4 wt % ENB, $M_w/M_n$ = 2.5 | ExxonMobil |
| Clay | Icecap K Clay | Burgess |
| ZnO | Kadox911 | Zinc Corp. Of America |
| Sunpar 150 m Oil | paraffinic oil | SUNPAR |
| $SnCl_2$ | Stannous Chloride | Mason Corp. |
| 0.5 MFR PP | Polypropylene homopolymer (Grade F-006-EC) 0.5 melt flow rate (MFR) | ExxonMobil |
| 1.3 MFR PP | Polypropylene homopolymer (Grade F-013-M) 1.3 melt flow rate (MFR) | ExxonMobil |
| 1500 MFR PP | Polypropylene homopolymer (Grade F-1500-EC) 1500 melt flow rate (MFR) | ExxonMobil |
| SP1045 | phenolic resin curing agent | Schenectady Int. |
| PP5341 | Polypropylene homopolymer, 0.3 melt flow rate MFR | ExxonMobil |
| 51S07A | Polypropylene homopolymer, MFR = 0.7 dg/min | Equistar |
| Irganox 1010 | Antioxidant | Ciba Geigy |
| PLB-5404 | Trimethylolpropanetrimethacrylate (75% active) | Rhein Chemie |
| PAR 100 DBPH | 2,5 dimethyl-2,5-di(t-butylperoxy)hexane (50% in oil) | Rhein Chemie |

Polymerization Procedure:

Polymerizations were carried out in a series of two 628 liter stirred reactors with continuous flow of feeds to the system and continuous withdrawal of products. Reactor temperature was controlled by controlling the chilling of the feed. The reactors were operated liquid full at a pressure of about 700 kPa.

Ethylene, propylene and ENB feeds were combined into one stream with hexane. The catalyst $VOCl_3$ and sesqui co-catalyst ethyl aluminum sesquichloride were fed separately to the reactor. The product from the reactor was deashed through a set of deashing vessels in which the hydrocarbon stream was contacted in countercurrent flow with water. The water was removed by settling and the deashed hydrocarbon phase was blended by on-line metering of the extender oil, if used, and fed into a flash drum in which a flowing stream of steam in hot water precipitated the polymer by removing the solvent into the vapor phase. The polymer crumb that resulted was dried in several steps through extrusion drying and the dry rubber was baled into the final product.

The range of reactor conditions exemplified in the instant disclosure is shown in the following series of tables, which provide the values of process parameters such as reactor temperature, residence time and cement concentration (wt % of polymer in the effluent). Also provided in these tables are the parameters that are calculated from the feed rates of individual components. These include the molar ratio of the co-catalyst to catalyst (Al/V), hydrogen used as chain-transfer agent for MW control to catalyst ($H_2/V$), ammonia (if used) as control agent for long chain branching to catalyst (NN), polymerization rate obtained by heat balance, polysplit (% of total production made in the first reactor) and the individual monomer conversions obtained as the ratio of monomer amount in the polymer to the monomer amount fed to the reactor. The monomer amount in the polymer is the product of production rate and polymer composition derived from FT-IR measurements.

In these examples, molecular weight (as determined by the Mooney viscosity) of the high MW component (MST) made in the first reactor and the final product MW (MST or ML) shown was controlled by changes to the hydrogen feed to each of the reactors. The oil extended Mooney viscosity was always measured with the ML rotor. The polysplit was controlled by varying the monomer feed rates to each of the reactors. The composition of each of the components was controlled by the relative concentration of monomers in the feed to each of the reactors.

Comparative Examples 1 and 5 were prepared consistent with WO 2003 066725A2, without extender oil. These EPDM polymers contain about 50 wt % of a polymer fraction having a Mooney viscosity in the range of 10 to 20 and about 50 wt % of a polymer fraction having a Mooney viscosity of about 200-250.

The process conditions for preparing the polymer in Comparative Example 1 are given below:

TABLE 2

| Comparative Example 1 | Reactor 1 | Reactor 2 (or overall) |
|---|---|---|
| Catalyst Efficiency (kg pol./kg cat.) | 732 | 705 |
| Al/V (mol/mol) | 6.0 | 5.1 |
| $H_2/V$ (mol/mol) | 0.40 | 1.27 |
| Polymerization rate (kg/h) | 68 | 133 |
| Polysplit (%) | 51% | 49% |
| Residence Time (mn) | 11.0 | 7.2 |
| Reactor Temperature (° C.) | 20.0 | 41.6 |
| Cement concentration (% wt) | 3.1 | 4.0 |
| Conv $C_2=$ (%) | 104.1 | 61.9 |
| Conv $C_3=$ (%) | 60.6 | 52.2 |
| Conv ENB (%) | 100.5 | 93.8 |

The samples were prepared via a Ziegler-Natta catalyzed process. The process conditions for preparing the polymer in Example 2 are given in Table 3:

TABLE 3

| Example 2 | Reactor 1 | Reactor 2 (or overall) |
|---|---|---|
| Catalyst Efficiency (kg pol./kg cat.) | 704 | 547 |
| Al/V (mol/mol) | 6.5 | 5.4 |
| $H_2/V$ (mol/mol) | 0.52 | 0.36 |
| Polymerization rate (kg/h) | 65 | 129 |
| Polysplit (%) | 50% | 50% |
| Residence Time (min) | 11.7 | 7.5 |
| Reactor Temperature (° C.) | 20.0 | 44.9 |
| Cement concentration (% wt) | 3.1 | 4.1 |
| Conv $C_2=$ (%) | 100 | 58 |
| Conv $C_3=$ (%) | 62 | 46 |
| Conv ENB (%) | 98 | 90 |

The process conditions for preparing the polymer in Example 3 are given in Table 4:

TABLE 3

| Example 3 | Reactor 1 | Reactor 2 (or overall) |
|---|---|---|
| Catalyst Efficiency (kg pol./kg cat.) | 699 | 560 |
| Al/V (mol/mol) | 6.5 | 5.5 |
| $H_2/V$ (mol/mol) | 0.52 | 0.41 |
| Polymerization rate (kg/h) | 65 | 130 |
| Polysplit (%) | 50% | 50% |
| Residence Time (mn) | 11.7 | 7.4 |
| Reactor Temperature (° C.) | 20.0 | 45.3 |
| Cement concentration (% wt) | 3.1 | 4.1 |
| Conv $C_2=$ (%) | 100 | 59 |
| Conv $C_3=$ (%) | 61 | 46 |
| Conv ENB (%) | 94 | 92 |

The process conditions for preparing the polymer in Example 4 are given in Table 4:

TABLE 4

| Example 4 | Reactor 1 | Reactor 2 (or overall) |
|---|---|---|
| Catalyst Efficiency (kg pol./kg cat.) | 1184 | 543 |
| Al/V (mol/mol) | 5.9 | 5.3 |
| $H_2/V$ (mol/mol) | 0.21 | 0.30 |
| N/V (mol/mol) | 1.3 | |
| Polymerization rate (kg/h) | 71 | 140 |
| Polysplit (%) | 51% | 49% |
| Residence Time (mn) | 11.2 | 7.3 |
| Reactor Temperature (° C.) | 20.0 | 45.0 |
| Cement concentration (% wt) | 3.4 | 4.6 |
| Conv $C_2=$ (%) | 100 | 60 |
| Conv $C_3=$ (%) | 47 | 56 |
| Conv ENB (%) | 94 | 98 |

The process conditions for preparing the polymer in Comparative Example 5 are given in Table 5:

TABLE 5

| Comparative Example 5 | Reactor 1 | Reactor 2 (or overall) |
|---|---|---|
| Catalyst Efficiency (kg pol./kg cat.) | 1150 | 490 |
| Al/V (mol/mol) | 6.6 | 5.4 |
| $H_2/V$ (mol/mol) | 0.07 | 0.82 |
| N/V (mol/mol) | 1.3 | |
| Polymerization rate (kg/h) | 67 | 133 |

TABLE 5-continued

| Comparative Example 5 | Reactor 1 | Reactor 2 (or overall) |
|---|---|---|
| Polysplit (%) | 50% | 50% |
| Residence Time (mn) | 11.3 | 7.2 |
| Reactor Temperature (° C.) | 20.0 | 42.8 |
| Cement concentration (% wt) | 3.1 | 4.1 |
| Conv $C_2=$ (%) | 100 | 60 |
| Conv $C_3=$ (%) | 47 | 48 |
| Conv ENB (%) | 97 | 92 |

Comparative Example 6 was a commercial monomodal EPDM polymer composition extended with 75 phr oil. Comparative Example 6 had a Mooney viscosity of about 250 ML(1+4@125° C.) in the absence of extender oil. This material is commercially available from ExxonMobil Chemical Company under the trade name Vistalon 3666 (V3666).

Examples 2, 3, and 4 comprised 50-52 wt % of a first polymer component having a Mooney viscosity of about 250, and a second polymer component having a Mooney viscosity of about 60 to 85. These polymers were extended with 30-40 phr oil. Without oil extension, these polymers had a Mooney viscosity of between 130 and 143, which render them unprocessable in the absence of oil extension.

The molecular weight, as evidence by the Mooney viscosity of the fraction made in each of the two reactors was controlled by the addition of hydrogen as a chain transfer agent. Hydrogen was fed into the reactors according to Equation (5), as discussed above.

The ratios calculated according to equation (5) and the actual values are shown for each example in Table 6:

TABLE 6

| | R1 $H_2/V$ | Overall $H_2/V$ | R1 Catalyst Efficiency | Overall Catalyst Efficiency | Catalyst Efficiency Ratio | Equation (5) | $(H_2/V)$ Ratio Actual |
|---|---|---|---|---|---|---|---|
| Comp EX-1 | 0.4 | 1.27 | 732 | 705 | 1.04 | 1.34 | 0.31 |
| EX-2 | 0.52 | 0.4 | 704 | 547 | 1.29 | 0.94 | 1.44 |
| EX-3 | 0.52 | 0.41 | 699 | 560 | 1.25 | 0.99 | 1.27 |
| EX-4 | 0.21 | 0.3 | 1184 | 543 | 2.18 | 0.39 | 0.70 |
| Comp EX-5 | 0.07 | 0.82 | 1150 | 490 | 2.35 | 0.34 | 0.09 |

The quantity $\{1.43 \times [(\text{Catalyst Efficiency})_{R1}/(\text{Catalyst Efficiency})_{Overall}]^{-1.67}\}$ divided the quantity $\{(H_2/V)_{R1}/(H_2/V)_{Overall}\}$ is less than 1 (i.e., the quantity $\{(H_2/V)_{R1}/(H_2/V)_{Overall}\}$ is greater than the quantity $\{1.43 \times [(\text{Catalyst Efficiency})_{R1}/(\text{Catalyst Efficiency})_{Overall}]^{-1.67}$ for the inventive Examples, but not for the Comparative Examples.

Comparative Example 7 is a commercial bimodal EPDM polymer composition without extender oil. This material is commercially available from ExxonMobil Chemical Company under the trade name Vistalon 7500 (V7500).

Comparative Example 8 is a unimodal oil extended EPDM rubber having an ethylene-propylene-ethylidene norbornene (oil=90 phr), Mooney (ML 1+4, 125° C.)=53, 66 wt % ethylene, 4.4 wt % ENB, $M_w/M_n$=2.5. This material is commercially available from ExxonMobil under the trade name VX-4779.

The Mooney viscosities of the second polymer fractions (ML F2 calc) were calculated using Equation 1 as described herein. The second polymer fractions of the Examples have higher molecular weights than those of Comparative Examples 1 and 5. Accordingly, the resulting number average molecular weights of the Examples are higher than those of Comparative Examples 1 and 5. Both Example 4 and Comparative Example 5 were prepared in the presence of $NH_3$ to reduce the acidity of the polymerization system and thus decrease the level of long chain branching in the polymers. The specific compositions are disclosed in Table 7.

TABLE 7

| Example | % $C_2$ | % ENB | R1 MST | Calc R2 ML | Final ML | Final MST | % Oil R1 | phr | Total ML | Total $M_n$ (*1000) | $M_w/M_n$ | BI | $M_n$, High (*1000) | $M_w/M_n$ | BI |
|---|---|---|---|---|---|---|---|---|---|---|---|---|---|---|---|
| CEx 1 | 63 | 4.4 | 46 | 11 | 42 | 9 | 50 | 0 | 42 | 38 | 7.7 | 0.59 | | | |
| Ex-2 | 64 | 4.4 | 49 | 81 | 141 | 29 | 50 | 39 | 52 | 96 | 4.3 | 0.6 | 113 | 4.6 | 0.56 |
| Ex-3 | 64.4 | 4.6 | 53 | 55 | 121 | 25 | 50 | 28 | 52 | 87 | 4.8 | 0.55 | 127 | 4.6 | 0.53 |
| Ex-4 | 64 | 4.8 | 52 | 63 | 126 | 26 | 50 | 35 | 57 | 102 | 3.8 | 0.78 | 199 | 2.8 | 0.86 |
| CEx-5 | 66.2 | 4.9 | 61 | 17 | 73 | 15 | 50 | 0 | 73 | 55 | 7.3 | 0.68 | | | |
| CEx-6 | | | 50 | | 242 | 50 | | 75 | 50 | 170 | 5.0 | 0.50 | | | |
| CEx-7 | | | 69 | 150 | 90 | 19 | 11 | 0 | 90 | 90 | 5.0 | 0.60 | | | |
| CEx-8 | | | 63 | | 305 | 63 | | 90 | 53 | 200 | 4.0 | 0.65 | | | |

TABLE 8

TPV Brabender Evaluations

| Amount (phr) | | | | | | | | |
|---|---|---|---|---|---|---|---|---|
| CEx-6 | 175 | | | | | | | |
| CEx-1 | | 100 | | | | | | |
| CEx-5 | | | 100 | | | | | |
| Ex-2 | | | | 139 | | | | |
| Ex-3 | | | | | 128 | | | |
| Ex-4 | | | | | | 135 | | |
| CEx-7 | | | | | | | 100 | |
| CEx-8 | | | | | | | | 190 |
| Clay | 42 | 42 | 42 | 42 | 42 | 42 | 42 | 42 |
| ZnO | 2 | 2 | 2 | 2 | 2 | 2 | 2 | 2 |
| PP5341 | 58 | 58 | 58 | 58 | 58 | 58 | 58 | 58 |

TABLE 8-continued

TPV Brabender Evaluations

| Amount (phr) | | | | | | | | |
|---|---|---|---|---|---|---|---|---|
| Precure Oil | 25 | 100 | 100 | 61 | 72 | 65 | 100 | 10 |
| Post Cure Oil | 30 | 30 | 30 | 30 | 30 | 30 | 30 | 30 |
| SP1045 | 5 | 5 | 5 | 5 | 5 | 5 | 5 | 5 |
| SnCl$_2$ anhydrous | 1.26 | 1.26 | 1.26 | 1.26 | 1.26 | 1.26 | 1.26 | 1.26 |
| Total | 338.3 | 338.3 | 338.3 | 338.3 | 338.3 | 338.3 | 338.3 | 338.3 |
| 130 phr oil Formulations | CEx-9 | CEx-10 | CEx-11 | Ex-12 | Ex-13 | Ex-14 | CEx-15 | CEx-16 |
| Hardness, ISO, Shore A | 69 | 63 | 62 | 68 | 67 | 69 | 65 | 72 |
| Tensile Strength, MPa | 6.7 | 4.3 | 5.2 | 7.5 | 6.9 | 7.4 | 6.6 | 6.9 |
| Elongation at break, % | 313 | 200 | 216 | 296 | 290 | 290 | 256 | 326 |
| Stress at 100% strain, MPa | 3.4 | 3.0 | 3.2 | 3.6 | 3.4 | 3.5 | 3.7 | 3.6 |
| Tension Set, % | 9 | 10 | 10 | 9 | 10 | 8 | 8 | 10 |
| Compression Set, % (22 h@70° C.) | 32 | 37 | 31 | 26 | 27 | 24 | 28 | 32 |
| Wt Gain, % (24 h@121° C.) | 80 | 105 | 80 | 74 | 75 | 71 | 81 | 74 |

Examples 12, 13, and 14, and Comparative Examples 9, 10, 11, 15, and 16 are TPV formulations prepared in a Brabender according to the following proportions:

Examples 19, 20, and 21, and Comparative Examples 17, 18, 22, 23, 24, and 25 are TPV formulations prepared in a Brabender batch mixer of 70 cc capacity at 100 revolutions per minute (RPM) and metal set temperature of 175° C. At time zero the rubber, zinc oxide, stannous chloride and about ⅓ oil was initially charged followed by the polypropylene addition. After about 2-3 minutes of fluxing another ⅓ oil was added slowly, followed by addition of SP1045 curative at around 5 minutes. Dynamic vulcanization was continued for about 2-3 minutes. Finally the last ⅓ oil was added slowly and mixing was continued for a total batch time of 12 to 17 minutes. Typically, the batch time for comparative oil-extended rubbers was shorter (about 10 min) since there was much less oil to be added to the composition.

Twin Screw Mixer Examples (Ex-) and Comparative Examples (CEx-) follow. The Barrel column indicates location of addition of various ingredients along the axis of the extruder; e.g. 2D=barrel section 2 down from feedthroat (FT)

TABLE 9A

Brabender

| | CEx-17 phr | CEx-18 phr | Ex-19 phr | Ex-20 phr | Ex-21 phr | CEx-22 phr | CEx-23 phr | CEx-24 phr | CEx-25 phr |
|---|---|---|---|---|---|---|---|---|---|
| CEx-6 | 175 | 175 | | | | | | | |
| Ex-2 | | | 139 | | | | | | |
| Ex-3 | | | | 128 | | | | | |
| Ex-4 | | | | | 135 | | | | |
| CEx 1 | | | | | | 100 | | | |
| CEx-5 | | | | | | | 100 | | |
| CEx-7 | | | | | | | | 100 | 100 |
| Clay | 42 | 42 | 42 | 42 | 42 | 42 | 42 | 42 | 42 |
| 51S07A | 58 | 58 | 58 | 58 | 58 | 58 | 58 | 58 | 58 |
| Irganox 1010 | 3 | 3 | 3 | 3 | 3 | 3 | 3 | 3 | 3 |
| Precure Oil | 25 | 25 | 61 | 72 | 65 | 100 | 100 | 100 | 100 |
| Post Cure Oil | 25 | 25 | 25 | 25 | 25 | 25 | 25 | 25 | 25 |
| PLB-5405 - Coagent | 5.6 | 5.6 | 5.6 | 5.6 | 5.6 | 5.6 | 5.6 | 5.6 | 5.6 |
| PAR 100 DBPH - peroxide | 6.6 | 6.6 | 6.6 | 6.6 | 6.6 | 6.6 | 6.6 | 6.6 | 6.6 |
| total | 340.2 | 340.2 | 340.2 | 340.2 | 340.2 | 340.2 | 340.2 | 340.2 | 340.2 |

TABLE 9B

Brabender

| | CEx-17 | CEx-18 | Ex-19 | Ex-20 | Ex-21 | CEx-22 | CEx-23 | CEx-24 | CEx-25 |
|---|---|---|---|---|---|---|---|---|---|
| Speed; RPM, 100 RPM | 100 | 100 | 100 | 100 | 100 | 100 | 100 | 100 | 100 |
| Metal Temperature; set ° C. | 180 | 180 | 180 | 180 | 180 | 180 | 180 | 180 | 180 |
| Torque @ Dump, m gm | 56 | 60 | 63 | 61 | 66 | 40 | 54 | 62 | 60 |
| Shore: ISO, A | 68 | 67 | 65 | 65 | 64 | 58 | 64 | 63 | 64 |
| Shore; leverload, A | 67 | 66 | 64 | 61 | 63 | 58 | 62 | 63 | 63 |
| Tensile Strength, MPa | 7.5 | 6.7 | 6.4 | 5.5 | 6.5 | 3.5 | 4.9 | 5.4 | 5.3 |
| Elongation at break, % | 421 | 403 | 340 | 343 | 353 | 254 | 279 | 316 | 326 |

TABLE 9B-continued

| | Brabender | | | | | | | | |
|---|---|---|---|---|---|---|---|---|---|
| | CEx-17 | CEx-18 | Ex-19 | Ex-20 | Ex-21 | CEx-22 | CEx-23 | CEx-24 | CEx-25 |
| Stress at 100% strain, MPa | 3.4 | 3.2 | 3.2 | 2.8 | 3.2 | 2.2 | 2.8 | 2.9 | 2.8 |
| Tension Set, % | 10.0 | 10.0 | 10.0 | 10.0 | 10.0 | 14.0 | 10.0 | 10.5 | 10.0 |
| Compression set %; specimen "B"(dia.51 "by thick .24") | | | | | | | | | |
| 25% compression 70°@22 hrs, % | 30 | 32 | 33 | 33 | 33 | 42 | 33 | 33 | 33 |
| 25% compression 100°@168 hrs, % | 38 | 42 | 38 | 39 | 41 | 57 | 37 | 40 | 38 |
| LCR Viscosity, Pa s @204 C, 1200 1/s | 79.4 | 84.1 | 95.7 | 97.9 | 93.5 | 84.8 | 91.9 | 96.3 | 91.3 |
| Die Swell range, % | 6...11 | 3...11 | 12...20 | 12...19 | 11...20 | 17...23 | 14...20 | 16...24 | 11...22 |
| % Weight Gain; IRM903, 24 h@121° C. | 99 | 104 | 114 | 120 | 108 | 146 | 119 | 123 | 119 |

TABLE 10a

| | | Run Number | | | | | | | |
|---|---|---|---|---|---|---|---|---|---|
| Raw Material | Barrel | CEx-26 PHR | CEx-27 PHR | CEx-28 PHR | CEx-29 PHR | CEx-30 PHR | CEx-31 PHR | CEx-32 PHR | CEx-33 PHR |
| CEx-6 | FT | 175 | 175 | 175 | 175 | 175 | 175 | | |
| CEx-7 | FT | | | | | | | 100 | 100 |
| Clay | FT | 42 | 42 | 42 | 42 | 42 | 42 | 42 | 42 |
| Zinc Oxide | FT | 2 | 2 | 2 | 2 | 2 | 2 | 2 | 2 |
| Stannous Chloride | FT | 1.26 | 1.26 | 1.26 | 1.26 | 1.26 | 1.26 | 1.26 | 1.26 |
| SP-1045 | 4D | 5 | 5 | 5 | 5 | 5 | 5 | | |
| SP-1045 | 6C | | | | | | | 5 | 5 |
| PP 5341 | FT | 58 | 58 | 65 | | | 35 | 58 | 58 |
| 0.5 MFR PP | FT | | | | 38 | 23 | | | |
| 1.3 MFR PP | FT | | | | 3 | 2 | | | |
| 1500 MFR PP | FT | | | | 17 | 11 | | | |
| Sunpar 150M Oil. | 2D | 5 | 5 | 5 | 5 | 5 | 5 | 10 | 9 |
| Sunpar 150M Oil. | 3D | | | | | | | 45 | 43 |
| Sunpar 150M Oil. | 8D | 50 | 20 | 20 | 50 | 50 | 50 | 75 | 78 |
| Total | | 338 | 308 | 315 | 338 | 315 | 315 | 338 | 338 |
| Hardness, Shore A | | 77 | 80 | 83 | 76 | 61 | 64 | 71 | 71 |
| Specific Gravity | | 0.97 | 0.96 | 0.97 | 0.97 | 0.94 | 0.97 | 0.93 | 0.94 |
| Ultimate Tensile Strength, MPa | | 8.04 | 8.04 | 8.04 | 8.04 | 8.04 | 8.04 | 8.04 | 8.04 |
| Ultimate Elongation, % | | 460 | 470 | 508 | 334 | 346 | 341 | 354 | 338 |
| M100, MPa | | 3.46 | 3.46 | 3.46 | 3.46 | 3.46 | 3.46 | 3.46 | 3.46 |
| Wt. Gain, % | | 73 | 86 | 83 | 71 | 93 | 88.5 | 101 | 104 |
| Color L | | 69.9 | 64.2 | 66.0 | 66.3 | 64.7 | 67.5 | 70.6 | 69.8 |
| Color a | | −1.2 | 0.4 | 0.2 | 0.7 | 0.9 | 0.0 | −0.9 | −1.0 |
| Color b | | 13.2 | 10.8 | 11.3 | 11.9 | 11.1 | 11.5 | 13.9 | 14.16 |
| LCR, at 1200 1/s, Pas | | 85 | 108 | 112 | 78 | 87 | 91 | 99 | 89 |
| ESR (micometer) | | 3.1 | 3.2 | 2.7 | 2.0 | 3.1 | 2.7 | 9.5 | 9.7 |
| Tension Set, % | | 14 | 16 | 18 | 11 | 6 | 7.5 | 12.5 | 13.5 |
| Compression Set, %, 22 h@70° C. | | 31 | 30 | 36 | 28 | 20 | 22 | 37 | 33 |

| Raw Material | Barrel | CEx-34 PHR | CEx-35 PHR | CEx-36 PHR | CEx-37 PHR | CEx-38 PHR | CEx-39 PHR | CEx-40 PHR |
|---|---|---|---|---|---|---|---|---|
| CEx-6 | FT | | | | | | | |
| CEx-7 | FT | 100 | 100 | 100 | 100 | 100 | 100 | 100 |
| Clay | FT | 42 | 42 | 42 | 42 | 42 | 42 | 42 |
| Zinc Oxide | FT | 2 | 2 | 2 | 2 | 2 | 2 | 2 |
| Stannous Chloride | FT | 1.26 | 1.26 | 1.26 | 1.26 | 1.26 | 1.26 | 1.26 |
| SP-1045 | 4D | | | | | | | |
| SP-1045 | 6C | 5 | 5 | 5 | 5 | 5 | 5 | 5 |
| PP 5341 | FT | 58 | 65 | | | | | |
| 0.5 MFR PP | FT | | | 38 | 38 | 42 | 42 | 23 |
| 1.3 MFR PP | FT | | | 3 | 3 | 3 | 3 | 2 |
| 1500 MFR PP | FT | | | 17 | 17 | 20 | 20 | 11 |
| Sunpar 150M Oil. | 2D | 10 | 7 | 9 | 9 | 7 | 7 | 9 |

TABLE 10a-continued

| | | | | | | | | |
|---|---|---|---|---|---|---|---|---|
| Sunpar 150M Oil. | 3D | 45 | 33 | 43 | 43 | 33 | 43 | 43 |
| Sunpar 150M Oil. | 8D | 45 | 60 | 78 | 78 | 60 | 50 | 78 |
| Total | | 308 | 315 | 338 | 338 | 315 | 315 | 315 |
| Hardness, Shore A | | 77 | 78 | 70 | 72 | 79 | 79 | 56 |
| Specific Gravity | | 0.97 | 0.97 | 0.98 | 0.97 | 0.97 | 1.00 | 1.00 |
| Ultimate Tensile Strength, MPa | | 8.04 | 8.04 | 8.04 | 8.04 | 8.04 | 8.04 | 8.04 |
| Ultimate Elongation, % | | 365 | 371 | 365 | 331 | 376 | 433 | 273 |
| M100, MPa | | 3.46 | 3.46 | 3.46 | 3.46 | 3.46 | 3.46 | 3.46 |
| Wt. Gain, % | | 96 | 90 | 81 | 74 | 79 | 73 | 87 |
| Color L | | 65.7 | 65.2 | 74.3 | 69.1 | 67.8 | 72.3 | 73.8 |
| Color a | | 0.1 | 0.1 | −2.3 | −0.1 | 0.5 | −1.3 | −1.7 |
| Color b | | 12.3 | 12.2 | 14.5 | 12.44 | 11.8 | 15.44 | 14.1 |
| LCR, at 1200l/s, Pas | | 113 | 111 | 91 | 76 | 96 | 84 | 80 |
| ESR (micometer) | | 9.0 | 7.5 | 8.7 | 4.7 | 2.5 | 2.4 | 4.1 |
| Tension Set, % | | 13.5 | 16.5 | 10 | 11 | 11.5 | 15 | 7.5 |
| Compression Set, %, 22 h@70° C. | | 35 | 37 | 24 | 28 | 39 | 40 | 28 |

TABLE 10b

| Raw Material | Barrel | CEx-41 PHR | CEx-42 PHR | CEx-43 PHR | CEx-44 PHR | CEx-45 PHR | CEx-46 PHR | CEx-47 PHR | Ex-48 PHR |
|---|---|---|---|---|---|---|---|---|---|
| CEx-1 | FT | 100 | 100 | 100 | 100 | 100 | 100 | 100 | |
| Ex-2 | FT | | | | | | | | 139 |
| Clay | FT | 42 | 42 | 42 | 42 | 42 | 42 | 42 | 42 |
| Zinc Oxide | FT | 2 | 2 | 2 | 2 | 2 | 2 | 2 | 2 |
| Stannous Chloride | FT | 1.26 | 1.26 | 1.26 | 1.26 | 1.26 | 1.26 | 1.26 | 1.26 |
| SP-1045 | 4D | | | | | | | | |
| SP-1045 | 6C | 5 | 5 | 5 | 5 | 5 | 5 | 5 | 5 |
| PP 5341 | FT | 58 | 58 | 58 | 65 | | | 35 | 58 |
| 0.5 MFR PP | FT | | | | | 38 | 42 | | |
| 1.3 MFR PP | FT | | | | | 3 | 3 | | |
| 1500 MFR PP | FT | | | | | 17 | 20 | | |
| Sunpar 150M Oil | 2D | 9 | 10 | 10 | 10 | 9 | 7 | 9 | 6 |
| Sunpar 150M Oil | 3D | 43 | 50 | 45 | 45 | 43 | 33 | 43 | 45 |
| Sunpar 150M Oil | 8D | 78 | 70 | 45 | 45 | 78 | 60 | 78 | 40 |
| Total | | 338 | 338 | 308 | 315 | 338 | 315 | 315 | 338 |
| Hardness, Shore A | | 69 | 69 | 75 | 77 | 68 | 76 | 54 | 74 |
| Specific Gravity | | 0.99 | 0.95 | 0.99 | 0.97 | 0.98 | 0.98 | 0.97 | 0.96 |
| Ultimate Tensile Strength, MPa | | 8.04 | 8.04 | 8.04 | 8.04 | 8.04 | 8.04 | 8.04 | 8.04 |
| Ultimate Elongation, % | | 362 | 358 | 387 | 379 | 333 | 351 | 276 | 391 |
| M100, MPa | | 3.46 | 3.46 | 3.46 | 3.46 | 3.46 | 3.46 | 3.46 | 3.46 |
| Wt. Gain, % | | 79 | 98 | 94 | 92 | 86 | 92 | 116 | 80 |
| Color L | | 74.6 | 72.4 | 69.1 | 67.6 | 75.0 | 68.4 | 74.4 | 70.5 |
| Color a | | −2.5 | −1.7 | −0.5 | 0.0 | −2.6 | −0.2 | −2.4 | −0.4 |
| Color b | | 15.7 | 13.9 | 12.6 | 12.1 | 17 | 13.1 | 15.5 | 12.1 |
| LCR, at 1200l/s, Pas | | 81 | 88 | 96 | 103 | 84 | 82 | 97 | 98 |
| ESR (micometer) | | 2.3 | 2.9 | 1.8 | 1.7 | 9.1 | 1.5 | 15.7 | 8.7 |
| Tension Set, % | | 15.5 | 13 | 15 | 16 | 12.5 | 15 | 8.5 | 11.5 |
| Compression Set, %, 22 h@70° C. | | 36 | 34 | 44 | 51 | 38 | 37 | 29 | 25 |

| Raw Material | Barrel | Ex-49 PHR | Ex-50 PHR | Ex-51 PHR | Ex-52 PHR | Ex-53 PHR | Ex-54 PHR | Ex-55 PHR |
|---|---|---|---|---|---|---|---|---|
| CEx-1 | FT | | | | | | | |
| Ex-2 | FT | 139 | 139 | 139 | 139 | 139 | 139 | 139 |
| Clay | FT | 42 | 42 | 42 | 42 | 42 | 42 | 42 |
| Zinc Oxide | FT | 2 | 2 | 2 | 2 | 2 | 2 | 2 |
| Stannous Chloride | FT | 1.26 | 1.26 | 1.26 | 1.26 | 1.26 | 1.26 | 1.26 |
| SP-1045 | 4D | | | | | | | |
| SP-1045 | 6C | 5 | 5 | 5 | 5 | 5 | 5 | 5 |
| PP 5341 | FT | 58 | 58 | 65 | | | | 35 |
| 0.5 MFR PP | FT | | | | 38 | 42 | 23 | |
| 1.3 MFR PP | FT | | | | 3 | 3 | 2 | |
| 1500 MFR PP | FT | | | | 17 | 20 | 11 | |
| Sunpar 150M Oil | 2D | 6 | 6 | 6 | 6 | 6 | 6 | 6 |

TABLE 10b-continued

| | | | | | | | | |
|---|---|---|---|---|---|---|---|---|
| | | Run Number | | | | | | |
| Sunpar 150M Oil | 3D | 35 | 20 | 20 | 35 | 20 | 35 | 35 |
| Sunpar 150M Oil | 8D | 50 | 31 | 35 | 50 | 35 | 50 | 50 |
| Total | | 338 | 304 | 315 | 338 | 315 | 315 | 315 |
| Hardness, Shore A | | 74 | 78 | 81 | 71 | 79 | 58 | 60 |
| Specific Gravity | | 0.95 | 0.98 | 0.98 | 0.95 | 0.96 | 0.97 | 0.96 |
| Ultimate Tensile Strength, MPa | | 8.04 | 8.04 | 8.04 | 8.04 | 8.04 | 8.04 | 8.04 |
| Ultimate Elongation, % | | 430 | 451 | 474 | 416 | 456 | 323 | 302 |
| M100, MPa | | 3.46 | 3.46 | 3.46 | 3.46 | 3.46 | 3.46 | 3.46 |
| Wt. Gain, % | | 84 | 81 | 79 | 79 | 83 | 87 | 89 |
| Color L | | 68.1 | 63.2 | 63.7 | 68.7 | 61.3 | 70.1 | 69.6 |
| Color a | | 0.0 | 1.1 | 1.0 | 0.4 | 2.1 | −0.2 | 0.0 |
| Color b | | 11.3 | 5.96 | 9.42 | 11.8 | 9.03 | 12.1 | 11.1 |
| LCR, at 1200 1/s, Pas | | 99 | 121 | 123 | 88 | 96 | 99 | 103 |
| ESR (micometer) | | 7.3 | 1.9 | 1.7 | 1.9 | 1.7 | 4.0 | 5.9 |
| Tension Set, % | | 11 | 13 | 14.5 | 10 | 13.5 | 6.5 | 6.5 |
| Compression Set, %, 22 h@70° C. | | 26 | 32 | 35 | 27 | 33 | 20 | 23 |

TABLE 10c

| Raw Material | Barrel | Ex-56 PHR | Ex-57 PHR | Ex-58 PHR | Ex-59 PHR | Ex-60 PHR | Ex-61 PHR | Ex-62 PHR |
|---|---|---|---|---|---|---|---|---|
| Ex-3 | FT | 128 | 128 | 128 | 128 | 128 | 128 | 128 |
| Ex-4 | FT | | | | | | | |
| Clay | FT | 42 | 42 | 42 | 42 | 42 | 42 | 42 |
| Zinc Oxide | FT | — | — | — | — | — | — | — |
| Stannous Chloride | FT | 2 | 2 | 2 | 2 | 2 | 2 | 2 |
| SP-1045 | 4D | 1.26 | 1.26 | 1.26 | 1.26 | 1.26 | 1.26 | 1.26 |
| SP-1045 | 6C | 5 | 5 | 5 | 5 | 5 | 5 | 5 |
| PP 5341 | FT | 58 | 58 | 58 | 65 | | | |
| 0.5 MFR PP | FT | | | | | 38 | 42 | 23 |
| 1.3 MFR PP | FT | | | | | 3 | 3 | 2 |
| 1500 MFR PP | FT | | | | | 17 | 20 | 11 |
| Sunpar 150M Oil | 2D | 10 | 20 | 10 | 10 | 8 | 6 | 8 |
| Sunpar 150M Oil | 3D | 45 | 35 | 35 | 35 | 35 | 25 | 35 |
| Sunpar 150M Oil | 8D | 47 | 47 | 27 | 27 | 59 | 42 | 59 |
| Total | | 338 | 338 | 308 | 315 | 338 | 315 | 315 |
| Hardness, Shore A | | 72 | 72 | 78 | 81 | 72 | 80 | 60 |
| Specific Gravity | | 0.94 | 0.93 | 0.98 | 0.98 | 0.97 | 0.98 | 1.00 |
| Ultimate Tensile Strength, MPa | | 8.04 | 8.04 | 8.04 | 8.04 | 8.04 | 8.04 | 8.04 |
| Ultimate Elongation, % | | 376 | 440 | 463 | 463 | 376 | 423 | 308 |
| M100, MPa | | 3.46 | 3.46 | 3.46 | 3.46 | 3.46 | 3.46 | 3.46 |
| Wt. Gain, % | | 86 | 89 | 86 | 77 | 72 | 79 | 76 |
| Color L | | 71.1 | 68.7 | 65.1 | 64.2 | 69.9 | 65.1 | 69.0 |
| Color a | | −0.8 | −0.5 | 0.9 | 0.5 | −0.4 | 1.4 | −0.4 |
| Color b | | 13.7 | 13.6 | 10.4 | 10.5 | 12.4 | 9.75 | 11.7 |
| LCR, at 1200 1/s, Pas | | 99 | 101 | 118 | 118 | 73 | 90 | 88 |
| ESR (micometer) | | 4.3 | 6.5 | 6.1 | 7.8 | 2.2 | 1.9 | 2.5 |
| Tension Set, % | | 12.5 | 10 | 12.5 | 15 | 12.5 | 12.5 | 6.0 |
| Compression Set, %, 22 h@70° C. | | 27 | 28 | 34 | 34 | 28 | 31 | 19 |

| Raw Material | Barrel | Ex-63 PHR | Ex-64 PHR | Ex-65 PHR | Ex-66 PHR | Ex-67 PHR | Ex-68 PHR | Ex-69 PHR |
|---|---|---|---|---|---|---|---|---|
| Ex-3 | FT | | | | | | | |
| Ex-4 | FT | 135 | 135 | 135 | 135 | 135 | 135 | 135 |
| Clay | FT | 42 | 42 | 42 | 42 | 42 | 42 | 42 |
| Zinc Oxide | FT | — | — | — | — | — | — | — |
| Stannous Chloride | FT | 2 | 2 | 2 | 2 | 2 | 2 | 2 |
| SP-1045 | 4D | 1.26 | 1.26 | 1.26 | 1.26 | 1.26 | 1.26 | 1.26 |
| SP-1045 | 6C | 5 | 5 | 5 | 5 | 5 | 5 | 5 |
| PP 5341 | FT | 58 | 58 | 58 | 65 | | | |
| 0.5 MFR PP | FT | | | | | 38 | 42 | 23 |
| 1.3 MFR PP | FT | | | | | 3 | 3 | 2 |
| 1500 MFR PP | FT | | | | | 17 | 20 | 11 |
| Sunpar 150M Oil | 2D | 10 | 7 | 5 | 5 | 7 | 5 | 7 |

TABLE 10c-continued

| | | \multicolumn{7}{c}{Run Number} | | | | | | | |
|---|---|---|---|---|---|---|---|---|
| Sunpar 150M Oil | 3D | 45 | 33 | 23 | 23 | 33 | 23 | 33 |
| Sunpar 150M Oil | 8D | 40 | 55 | 38 | 38 | 55 | 38 | 55 |
| Total | | 338 | 338 | 308 | 315 | 338 | 315 | 315 |
| Hardness, Shore A | | 72 | 74 | 78 | 80 | 72 | 81 | 61 |
| Specific Gravity | | 0.95 | 0.96 | 0.96 | 0.96 | 0.96 | 0.99 | 1.11 |
| Ultimate Tensile Strength, MPa | | 8.04 | 8.04 | 8.04 | 8.04 | 8.04 | 8.04 | 8.04 |
| Ultimate Elongation, % | | 409 | 389 | 432 | 438 | 369 | 487 | 307 |
| M100, MPa | | 3.46 | 3.46 | 3.46 | 3.46 | 3.46 | 3.46 | 3.46 |
| Wt. Gain, % | | 79 | 70 | 82 | 79 | 72 | 68 | 68 |
| Color L | | 64.3 | 67.8 | 64.4 | 62.5 | 68.7 | 63.3 | 68.6 |
| Color a | | 0.7 | −0.2 | 1.1 | 1.2 | 0.0 | 1.5 | −0.4 |
| Color b | | 10.1 | 11.4 | 8.82 | 8.62 | 11.6 | 9.31 | 11.4 |
| LCR, at 1200 1/s, Pas | | 96 | 95 | 110 | 120 | 93 | 93 | 90 |
| ESR (micometer) | | 5.7 | 4.7 | 5.3 | 5.0 | 0.0 | 0.0 | 0.0 |
| Tension Set, % | | 12.5 | 12.5 | 14 | 16 | 12.5 | 15.5 | 7 |
| Compression Set, %, 22 h@70° C. | | 26 | 32 | 31 | 36 | 26 | 33 | 20 |

TABLE 10d

| | | \multicolumn{11}{c}{Run Number} | | | | | | | | | | | |
|---|---|---|---|---|---|---|---|---|---|---|---|---|
| Raw Material | Barrel | CEx-70 PHR | CEx-71 PHR | CEx-72 PHR | CEx-73 PHR | CEx-74 PHR | CEx-75 PHR | CEx-76 PHR | CEx-77 PHR | CEx-78 PHR | CEx-79 PHR | CEx-80 PHR |
| CEx-5 | FT | 100 | 100 | 100 | 100 | 100 | 100 | 100 | | | | |
| CEx-8 | FT | | | | | | | | 190 | 190 | 190 | 190 |
| Clay | FT | 42 | 20 | 20 | 20 | 42 | 42 | 20 | 42 | 42 | 42 | 42 |
| Zinc Oxide | FT | | 22 | 22 | 22 | | | 22 | 2 | 2 | 2 | 2 |
| Stannous Chloride | FT | 2 | 2 | 2 | 2 | 2 | 2 | 2 | 1.26 | 1.26 | 1.26 | 1.26 |
| SP-1045 | 4D | 1.26 | 1.26 | 1.26 | 1.26 | 1.26 | 1.26 | 1.26 | 5 | 5 | 5 | 5 |
| SP-1045 | 6C | 5 | 5 | 5 | 5 | 5 | 5 | 5 | | | | |
| PP 5341 | FT | 58 | 58 | 58 | 65 | | | | 58 | | | 35 |
| 0.5 MFR PP | FT | | | | | 38 | 38 | 42 | | 38 | 23 | |
| 1.3 MFR PP | FT | | | | | 3 | 3 | 3 | | 3 | 2 | |
| 1500 MFR PP | FT | | | | 17 | 17 | 20 | | 17 | 11 | | |
| Sunpar 150M Oil. | 2D | 10 | 10 | 8 | 8 | 10 | 10 | 8 | 5 | 5 | 5 | 5 |
| Sunpar 150M Oil. | 3D | 45 | 55 | 35 | 35 | 45 | 45 | 35 | | | | |
| Sunpar 150M Oil. | 8D | 75 | 65 | 58 | 58 | 75 | 75 | 58 | 35 | 35 | 35 | 35 |
| Total | | 338 | 338 | 308 | 315 | 338 | 338 | 315 | 338 | 338 | 315 | 315 |
| Hardness, Shore A | | 71 | 72 | 78 | 78 | 69 | 69 | 79 | 76 | 74 | 63 | 66 |
| Specific Gravity | | 0.94 | 0.96 | 1.01 | 0.97 | 0.94 | 0.95 | 0.98 | 0.95 | 0.94 | 0.96 | 0.97 |
| Ultimate Tensile Strength, MPa | | 8.04 | 8.04 | 8.04 | 8.04 | 8.04 | 8.04 | 8.04 | 8.04 | 8.04 | 8.04 | 8.04 |
| Ultimate Elongation, % | | 372 | 393 | 358 | 382 | 379 | 356 | 383 | 521 | 453 | 399 | 439 |
| M100, MPa | | 3.46 | 3.46 | 3.46 | 3.46 | 3.46 | 3.46 | 3.46 | 3.46 | 3.46 | 3.46 | 3.46 |
| Wt. Gain, % | | 89 | 84 | 71 | 80 | 91 | 85 | 76 | 80 | 79 | 85 | 87 |
| Color L | | 71.1 | 71.7 | 68.3 | 67.8 | 72.1 | 74.4 | 70.8 | 64.1 | 61.2 | 65.3 | 67.8 |
| Color a | | −0.9 | −1.2 | −0.6 | 0.1 | −1.6 | −1.8 | −0.5 | 1.3 | 1.9 | 1.2 | 0.6 |
| Color b | | 13 | 12.8 | 11.7 | 10.9 | 13.7 | 14.46 | 12.9 | 9.48 | 9.76 | 10 | 10.1 |
| LCR, at 1200 1/s, Pas | | 93 | 92 | 101 | 115 | 100 | 89 | 88 | 90 | 72 | 80 | 93 |
| ESR (micometer) | | 6.0 | 5.0 | 3.2 | 3.9 | 8.9 | 5.2 | 2.2 | 6.9 | 1.2 | 3.1 | 8.0 |
| Tension Set, % | | 15.5 | 15 | 16 | 16 | 12.5 | 10 | 15 | 12.5 | 11.5 | 7.5 | 9.5 |
| Compression Set, %, 22 h@70° C. | | 33 | 36 | 34 | 34 | 28 | 29 | 30 | 31 | 27 | 20 | 21 |

General Process Description

In the above tables, the Comparative Examples and the Examples were made in a continuous twin screw extruder. The comparative EPDM or the inventive bimodal EPDM was fed into the feed throat (FT) of a Coperion ZSK twin screw extruder (Coperion ZSK 53), L/d (length of extruder over its diameter) of 43. One or more thermoplastic resins was also fed into the feed throat along with other reaction rate control agents such as zinc oxide and stannous chloride. Filler such as clay was also added into the feed throat. The reaction rate control agents were mixed into the rubber. The rubber and thermoplastic resin were mixed and softened or melted in the early section of the extruder. Clay filler was also mixed with rubber and thermoplastics. Process oil was injected into the extruder at three different locations (in L/d measurement) along the extruder. The curative was injected into the extruder after the rubber and thermoplastics commenced blending. Rubber crosslinking reactions were initiated and accelerated either by temperature or catalysts or both. During the crosslinking reactions, a typical phase inversion occurred wherein an essentially continuous phase of molten rubber and dispersed phase of molten thermoplastic was changed into a dispersed phase of crosslinked rubber particles in a continuous phase of molten thermoplastic.

Thus, the aspects of the invention can be described by the various numbered embodiments:

1. A thermoplastic vulcanizate composition comprising a dynamically-cured rubber; and from about 20 to about 300 parts by weight of a thermoplastic resin per 100 parts by weight dynamically-cured rubber; wherein the dynamically-cured rubber comprises a multimodal polymer composition cured with a curing agent, the multimodal polymer composition comprising:
   a) 45 to 75 wt % of a first polymer fraction comprising ethylene, a $C_3$-$C_{10}$ alpha-olefin, and a non-conjugated diene, wherein the first polymer fraction has been polymerized in a first reactor in a series of two or more reactors using a first Ziegler-Natta catalyst system, wherein the first polymer fraction has a Mooney viscosity of greater than or equal to about 150 ML(1+4@125° C.);
   b) 25 to 55 wt % of a second polymer fraction comprising ethylene, a $C_3$-$C_{10}$ alpha-olefin, and a non-conjugated diene, wherein the second polymer fraction has been polymerized in the presence of the first polymer fraction in a subsequent reactor in the series of two or more reactors using a second Ziegler-Natta catalyst system, wherein the second polymer fraction has a Mooney viscosity of greater than or equal to 20 ML(1+4@125° C.), and less than or equal to 120 ML(1+4@125° C.); and
   c) from about 10 phr to about 50 phr of an extender oil, which is a liquid at 25° C.,
   wherein the multimodal polymer composition has a number average molecular weight of greater than or equal to about 60,000, and less than or equal to about 350,000 g/mol, and a Mooney viscosity of less than 90 ML(1+4@125° C.).
2. The thermoplastic vulcanizate composition of embodiment 1, wherein the curing agent is a phenolic resin.
3. The thermoplastic vulcanizate composition of any one of the preceding numbered embodiments, further comprising: from 0.2 to 2.0 parts by weight stannous chloride per 100 parts by weight rubber; and from 0.25 to 4.0 parts by weight metal oxide per 100 parts by weight rubber.
4. 
5. The thermoplastic vulcanizate composition of any one of the preceding numbered embodiments, where the cured rubber is cured to an extent that not more than 15 weight percent of the rubber is extractable by using boiling xylene as an extractant.
6. The thermoplastic vulcanizate composition of any one of the preceding numbered embodiments, where the cured rubber is cured to an extent that not more than 10 weight percent of the rubber is extractable by using boiling xylene as an extractant.
7. The thermoplastic vulcanizate composition of any one of the preceding numbered embodiments, where the cured rubber is cured to an extent that not more than 5 weight percent of the rubber is extractable by using boiling xylene as an extractant.
8. The thermoplastic vulcanizate composition of any one of the preceding numbered embodiments, further comprising from about 30 to about 250 parts by weight oil per 100 parts by weight rubber.
9. The thermoplastic vulcanizate composition of any one of the preceding numbered embodiments, where the cured rubber is in the form of discrete particles dispersed within the thermoplastic resin, and where the discrete particles have an average particle size of less than 50 micrometers.
10. The thermoplastic vulcanizate composition of any one of the preceding numbered embodiments, wherein the first polymer fraction has a Mooney viscosity greater than or equal to about 200 ML(1+4@125° C.).
11. The thermoplastic vulcanizate composition of any one of the preceding numbered embodiments, wherein the second polymer fraction has a Mooney viscosity less than or equal to about 90 ML(1+4@125° C.).
12. The thermoplastic vulcanizate composition of any one of the preceding numbered embodiments, wherein the multimodal polymer composition has a Mooney viscosity of less than or equal to about 60 ML(1+4@125° C.).
13. The thermoplastic vulcanizate composition of any one of the preceding numbered embodiments, wherein the $C_3$-$C_{10}$ alpha-olefin of the first polymer fraction and the $C_3$-$C_{10}$ alpha-olefin of the second polymer fraction are propylene, butene, or a combination thereof
14. The thermoplastic vulcanizate composition of any one of the preceding numbered embodiments, wherein the weight percent of ethylene in the first polymer fraction differs from the weight percent of ethylene in the second polymer fraction by less than or equal to 20 wt %.
15. The thermoplastic vulcanizate composition of any one of the preceding numbered embodiments, wherein the multimodal polymer composition comprises about 35 to about 90 mol % ethylene.
16. The thermoplastic vulcanizate composition of any one of the preceding numbered embodiments, having a Shore A hardness from about 30 to about 100.
17. The thermoplastic vulcanizate composition of any one of the preceding numbered embodiments, having a tensile strength of from about 5 MPa to about 20 MPa.
18. The thermoplastic vulcanizate composition of any one of the preceding numbered embodiments, having an elongation at break of from about 200% to about 500%.
19. The thermoplastic vulcanizate composition of any one of the preceding numbered embodiments, having a tension set of from about 7% to about 20%.
20. The thermoplastic vulcanizate composition of any one of the preceding numbered embodiments, having a compression set at 22 h@ 70° C., of from about 20% to about 50%.
21. The thermoplastic vulcanizate composition of any one of the preceding numbered embodiments, wherein the multimodal polymer composition has an inherent viscosity measured in decalin at 135° C., of from about 2 to about 8 dl/g.
22. A molded article or extrudate prepared from a composition comprising the thermoplastic vulcanizate composition of the thermoplastic vulcanizate composition of any one of the preceding numbered embodiments.
23. A process for forming a thermoplastic vulcanizate comprising dynamically vulcanizing a rubber with a curing agent within a blend comprising the rubber, the curing agent, and a thermoplastic polymer of any one of the preceding embodiments.
24. The process of embodiment 23, further comprising addition of a chain transfer agent into the first reactor, the subsequent reactor, or both.
25. The process of any one of embodiments 23-24, wherein the chain transfer agent is selected from the group consisting of hydrogen, diethyl zinc, $NH_3$, $C_1$-$C_{10}$ alkyl amines, $C_1$-$C_{10}$ alkyl silanes, and a combination thereof.
26. The process of any one of embodiments 23-25, wherein the first Ziegler-Natta catalyst system and the second Ziegler-Natta catalyst system each comprise vanadium, and wherein hydrogen is fed into the first reactor and into the subsequent reactor according to the equation:

$$\frac{(H_2/V)_{R1}}{(H_2/V)_{Overall}} > 1.43 \times \left[ \frac{(\text{Catalyst Efficiency})_{R1}}{(\text{Catalyst Efficiency})_{Overall}} \right]^{-1.67}$$

wherein $(H_2/V)_{R1}$ is the molar ratio of the moles of hydrogen fed into the first reactor to the moles of catalyst fed to the first reactor;

(H$_2$/V)$_{Overall}$ is the molar ratio of the moles of hydrogen fed into both the first reactor and into the second reactor to the moles of catalyst fed to both the first and second reactors;

(Catalyst Efficiency)$_{R1}$ is the catalyst efficiency of the first catalyst system in the first reactor, calculated by dividing the production rate in the first reactor by the mass amount of catalyst fed to the first reactor; and (Catalyst Efficiency)$_{OVERALL}$ is the catalyst efficiency of the first and second reactors combined, calculated by dividing the combined production rate from both reactors by the total catalyst feed (mass rate) to both reactors.

27. The process of any one of embodiments 23-26, wherein the quantity $\{1.43\times[(\text{Catalyst Efficiency})_{R1}/(\text{Catalyst Efficiency})_{Overall}]^{-1.67}\}$ divided the quantity $\{(H_2/V)_{R1}/(H_2/V)_{Overall}\}$ is less than or equal to about 0.9.

28. The process of any one of embodiments 23-27, wherein the curing agent is a phenolic resin.

29. The process of any one of embodiments 23-28, wherein the blend further comprises from 0.2 to 0.9 parts by weight stannous chloride per 100 parts by weight rubber, and from 0.25 to 4.0 parts by weight metal oxide, per 100 parts by weight rubber.

Another aspect of the present invention is to the use of a thermoplastic vulcanizate composition comprising a dynamically-cured rubber; and from about 20 to about 300 parts by weight of a thermoplastic resin per 100 parts by weight dynamically-cured rubber; wherein the dynamically-cured rubber comprises a multimodal polymer composition cured with a curing agent, the multimodal polymer composition comprising:

a) 45 to 75 wt % of a first polymer fraction comprising ethylene, a $C_3$-$C_{10}$-alpha-olefin, and a non-conjugated diene, wherein the first polymer fraction has been polymerized in a first reactor in a series of two or more reactors using a first Ziegler-Natta catalyst system, wherein the first polymer fraction has a Mooney viscosity of greater than or equal to about 150 ML(1+4@125° C.);

b) 25 to 55 wt % of a second polymer fraction comprising ethylene, a $C_3$-$C_{10}$ alpha-olefin, and a non-conjugated diene, wherein the second polymer fraction has been polymerized in the presence of the first polymer fraction in a subsequent reactor in the series of two or more reactors using a second Ziegler-Natta catalyst system, wherein the second polymer fraction has a Mooney viscosity of greater than or equal to 20 ML(1+4@125° C.), and less than or equal to 120 ML(1+4@125° C.); and c) from about 10 phr to about 50 phr of an extender oil, which is a liquid at 25° C., wherein the multimodal polymer composition has a number average molecular weight of greater than or equal to about 60,000, and less than or equal to about 350,000 g/mol, and a Mooney viscosity of less than 90 ML(1+4@125° C.).

Yet another aspect of the invention is to the use of a thermoplastic vulcanizate composition possessing a compression set of less than 35 (22 h@70° C.) and a tension set of less than 15% comprising a dynamically-cured rubber, and from about 25 to about 100 parts by weight of a thermoplastic resin per 100 parts by weight dynamically-cured rubber; wherein the dynamically-cured rubber comprises ethylene, a $C_3$-$C_{10}$ alpha-olefin, and a non-conjugated diene, and from about 10 phr to about 50 phr of an extender oil.

Various modifications and alterations that do not depart from the scope and spirit of this invention will become apparent to those skilled in the art. This invention is not to be duly limited to the illustrative embodiments set forth herein.

What is claimed is:

1. A thermoplastic vulcanizate composition comprising a dynamically-cured rubber; and from about 20 to about 300 parts by weight of a thermoplastic resin per 100 parts by weight dynamically-cured rubber; wherein the dynamically-cured rubber comprises a multimodal polymer composition cured with a curing agent, the multimodal polymer composition comprising:

a) 45 to 75 wt % of a first polymer fraction comprising ethylene, a $C_3$-$C_{10}$ alpha-olefin, and a non-conjugated diene, wherein the first polymer fraction has been polymerized in a first reactor in a series of two or more reactors using a first Ziegler-Natta catalyst system, wherein the first polymer fraction has a Mooney viscosity of greater than or equal to about 150 ML(1+4@125° C.);

b) 25 to 55 wt % of a second polymer fraction comprising ethylene, a $C_3$-$C_{10}$ alpha-olefin, and a non-conjugated diene, wherein the second polymer fraction has been polymerized in the presence of the first polymer fraction in a subsequent reactor in the series of two or more reactors using a second Ziegler-Natta catalyst system, wherein the second polymer fraction has a Mooney viscosity of greater than or equal to 55 Ml(1+4@125° C.), and less than or equal to 120 ML(1+4@125° C.); and c) from about 10 phr to about 50 phr of an extender oil, which is a liquid at 25° C., wherein the first polymer fraction and second polymer fraction combined have a number average molecular weight of greater than or equal to about 60,000, and less than or equal to about 350,000 g/mol, and a Mooney viscosity of 121 to 141 ML(1+4@125° C.).

2. The thermoplastic vulcanizate composition of claim 1, wherein the curing agent is a phenolic resin.

3. The thermoplastic vulcanizate composition of claim 1, further comprising:

from 0.2 to 2.0 parts by weight stannous chloride per 100 parts by weight rubber; and from 0.25 to 4.0 parts by weight metal oxide per 100 parts by weight rubber.

4. The thermoplastic vulcanizate composition of claim 1, wherein the cured rubber is cured to an extent that not more than 15 weight percent of the rubber is extractable by using boiling xylene as an extractant.

5. The thermoplastic vulcanizate composition of claim 1, further comprising from about 30 to about 250 parts by weight oil per 100 parts by weight rubber.

6. The thermoplastic vulcanizate composition of claim 1, wherein the cured rubber is in the form of discrete particles dispersed within the thermoplastic resin, and where the discrete particles have an average particle size of less than 50 micrometers.

7. A molded article or extrudate prepared from a composition comprising the thermoplastic vulcanizate composition of claim 1.

8. The thermoplastic vulcanizate composition of claim 1, wherein the first polymer fraction has a Mooney viscosity greater than or equal to about 200 ML(1+4@125° C.).

9. The thermoplastic vulcanizate composition of claim 1, wherein the second polymer fraction has a Mooney viscosity less than or equal to about 90 ML(1+4@125° C.).

10. The thermoplastic vulcanizate composition of claim 1, wherein the $C_3$-$C_{10}$ alpha-olefin of the first polymer fraction and the $C_3$-$C_{10}$ alpha-olefin of the second polymer fraction are propylene, butene, or a combination thereof.

11. The thermoplastic vulcanizate composition of claim 1, wherein the weight percent of ethylene in the first polymer fraction differs from the weight percent of ethylene in the second polymer fraction by less than or equal to 20 wt %.

12. The thermoplastic vulcanizate composition of claim 1, wherein the weight percent of diene in the first polymer fraction differs from the weight percent of diene in the second polymer fraction by less than or equal to 8 wt %.

13. The thermoplastic vulcanizate composition of claim 1, wherein the thermoplastic resin comprises polypropylene.

14. The thermoplastic vulcanizate composition of claim 13, having a Shore A hardness from about 30 to about 100.

15. The thermoplastic vulcanizate composition of claim 13, having a tensile strength of from about 5 MPa to about 20 MPa.

16. The thermoplastic vulcanizate composition of claim 13, having an elongation at break of from about 200% to about 500%.

17. The thermoplastic vulcanizate composition of claim 13, having a tension set of from about 7% to about 20%.

18. The thermoplastic vulcanizate composition of claim 13, having a compression set at 22 h@70° C., of from about 20% to about 50%.

19. The thermoplastic vulcanizate composition of claim 13, having a weight gain at 24 h@121° C., of from about 60% to about 100%.

20. The thermoplastic vulcanizate composition of claim 13, having a LCR viscosity at 204° C., 1200l/s, of from about 60 Pa s to about 100 Pa s.

21. The thermoplastic vulcanizate composition of claim 13, wherein the multimodal polymer composition has an inherent viscosity measured in decalin at 135° C., of from about 2 to about 8 dl/g.

22. A thermoplastic vulcanizate composition comprising a dynamically-cured rubber and from about 20 to about 300 parts by weight of a thermoplastic resin per 100 parts by weight rubber, wherein the dynamically cured rubber comprises a multimodal polymer composition cured with a curing agent, wherein the multimodal polymer composition is produced by a process comprising the steps of:

a) adding a first set of monomers comprising ethylene, a $C_3$-$C_{10}$ alpha-olefin, and non-conjugated diene, and a first Ziegler-Natta catalyst system into a first reactor of a series of two or more reactors;

b) polymerizing the first set of monomers to produce a first reactor effluent comprising a first polymer fraction having a Mooney viscosity of greater than or equal to 150 ML(1+4@125° C.);

c) directing the first reactor effluent into a subsequent reactor of the series of two or more reactors;

d) adding a second set of monomers comprising ethylene, a $C_3$-$C_{10}$ alpha-olefin, and non-conjugated diene, and a second Ziegler-Natta catalyst system into the subsequent reactor of the series of two or more reactors;

e) polymerizing the second set of monomers in the presence of the first polymer fraction to produce a second reactor effluent comprising at least a portion of the first polymer fraction and a second polymer fraction having a Mooney viscosity of greater than or equal to 55 ML(1+4@125° C.), and less than or equal to 120 ML(1+4@125° C.); and f) adding from about 10 phr to about 50 phr of an extender oil into the second reactor effluent to produce the multimodal polymer composition, wherein the multimodal polymer composition comprises 45 to 75 wt % of the first polymer fraction; and 25 to 55 wt % of the second polymer fraction;

and wherein the first polymer fraction and second polymer fraction combined have a number average molecular weight of greater than or equal to about 60,000, and less than or equal to about 350,000 g/mol, a Mooney viscosity of 121 to 141 mL(1+4@125° C.), and an inherent viscosity measured in decalin at 135° C., of from 3 to about 8 dl/g.

23. The thermoplastic vulcanizate composition of claim 22, wherein the first Ziegler-Natta catalyst system, the second Ziegler-Natta catalyst system, or both comprise $VOCl_3$.

24. The thermoplastic vulcanizate composition of claim 22, further comprising addition of a solvent to the first reactor prior to the polymerizing of the first set of monomers, addition of a solvent to the subsequent reactor prior to the polymerizing of the second set of monomers, or a combination thereof, wherein the solvent comprises a $C_4$ to $C_{12}$ aliphatic hydrocarbon, a $C_4$ to $C_{12}$ cycloaliphatic hydrocarbon, a $C_5$ to $C_{20}$ aromatic hydrocarbon, or a combination thereof.

25. The thermoplastic vulcanizate composition of claim 24, further comprising the step of steam stripping of the second reactor effluent to remove at least a portion of the solvent to produce the multimodal polymer composition.

* * * * *